(12) United States Patent
Suzuki

(10) Patent No.: US 11,225,174 B2
(45) Date of Patent: Jan. 18, 2022

(54) LIFTER DEVICE

(71) Applicant: TOYOTA BOSHOKU KABUSHIKI KAISHA, Aichi-ken (JP)

(72) Inventor: Yasuaki Suzuki, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/903,914

(22) Filed: Jun. 17, 2020

(65) Prior Publication Data
US 2020/0398706 A1    Dec. 24, 2020

(30) Foreign Application Priority Data

Jun. 21, 2019 (JP) .............................. JP2019-115240

(51) Int. Cl.
*B60N 2/16* (2006.01)
*F16D 11/16* (2006.01)
(Continued)

(52) U.S. Cl.
CPC ............. *B60N 2/165* (2013.01); *B60N 2/167* (2013.01); *B60N 2/1625* (2013.01);
(Continued)

(58) Field of Classification Search
CPC ..... B60N 2/165; B60N 2/1655; B60N 2/2251
See application file for complete search history.

(56) References Cited

U.S. PATENT DOCUMENTS

| 8,851,570 B2 * | 10/2014 | Fujihara | B60N 2/1615 |
| | | | 297/344.15 |
| 2013/0026806 A1 * | 1/2013 | Yamada | B60N 2/167 |
| | | | 297/311 |

(Continued)

FOREIGN PATENT DOCUMENTS

| DE | 3201309 | 7/1983 |
| DE | 102018214892 | 3/2019 |

(Continued)

OTHER PUBLICATIONS

Official Action issued in German Patent Application No. 102020207465.8 dated May 17, 2021, with English translation.

*Primary Examiner* — Sarah B McPartlin
(74) *Attorney, Agent, or Firm* — Greenblum & Bernstein, P.L.C.

(57) ABSTRACT

A lifter device includes: a pinion gear; a rotation control device including: a rotation shaft rotating in synchronization with the pinion gear; a support member supporting the rotation shaft; a rotation drive mechanism configured to rotate the rotation shaft; and a lock mechanism configured to lock rotation of the rotation shaft when an operation handle is in an operation-released state and including: a first tooth; and a second tooth configured to selectively mesh with the first tooth to lock relative rotation of the rotation shaft and the support member; and a speed increasing mechanism provided closer to the rotation shaft than a meshing portion of the first tooth and the second tooth in a rotation transmission path, configured to transmit the rotation of the rotation shaft to one of the first tooth and the second tooth, and configured to speed up the transmitted rotation of the rotation shaft.

10 Claims, 35 Drawing Sheets

(51) Int. Cl.
*F16H 1/28* (2006.01)
*F16H 51/00* (2006.01)
*F16D 63/00* (2006.01)

(52) U.S. Cl.
CPC ......... *B60N 2/1655* (2013.01); *B60N 2/1685* (2013.01); *F16D 11/16* (2013.01); *F16D 63/006* (2013.01); *F16H 1/28* (2013.01); *F16H 51/00* (2013.01)

(56) References Cited

U.S. PATENT DOCUMENTS

| | | |
|---|---|---|
| 2013/0137545 A1 | 5/2013 | Oki |
| 2015/0096859 A1 | 4/2015 | Isoda et al. |
| 2019/0070982 A1 | 3/2019 | Kajino et al. |
| 2019/0210489 A1 | 7/2019 | Sato |
| 2021/0207665 A1* | 7/2021 | Mikasa ................ B60N 2/1615 |

FOREIGN PATENT DOCUMENTS

| | | |
|---|---|---|
| EP | 2735471 | 5/2014 |
| JP | 2014-101093 | 6/2014 |
| JP | 2018-35847 A | 3/2018 |
| JP | 2018-35851 A | 3/2018 |

* cited by examiner

LIFTER DEVICE

CROSS-REFERENCE TO RELATED APPLICATIONS

This application claims priority from Japanese Patent Application No. 2019-115240 filed on Jun. 21, 2019, the entire contents of which are incorporated herein by reference.

TECHNICAL FIELD

The present disclosure relates to a lifter device used in a seat of an automobile or the like.

BACKGROUND

A lifter device used in a seat of an automobile or the like adjusts a height of a seat cushion with respect to a floor by an operation of an operation handle, and various types of lifter devices have been developed. According to a disclosure of JP-A-2018-035847, when an operation handle is operated on a seat lifting side or a lowering side, a height is adjusted by an amount corresponding to an operation amount for each operation, and the operation of the operation handle, that is, a so-called pumping operation is repeated until a height desired by a seated person is reached.

Specifically, a rotation control device is configured such that a pinion gear coupled to a link mechanism is rotated according to the operation of the operation handle on the seat lifting side or the lowering side so as to lift or lower the seat. On a rotation shaft of the pinion gear, the rotation control device includes a rotation drive mechanism configured to rotationally drive the pinion gear and a lock mechanism configured to lock rotation of the pinion gear.

When the operation handle is operated on the seat lifting side or the lowering side, the pinion gear is rotationally driven by the rotation drive mechanism, so as to lift or lower the seat. Meanwhile, the lock mechanism is unlocked upon receiving an operation force from the operation handle, and locks the rotation of the pinion gear at a current position when the lock mechanism stops receiving the operation force from the operation handle.

The lock mechanism includes internal teeth provided on a fixed side support member and external teeth provided on the rotation shaft of the pinion gear. When the external teeth mesh with the internal teeth, rotation of the rotation shaft of the pinion gear with respect to the fixed side support member is locked, and the lock is released when the meshing is released.

According to a disclosure of JP-A-2018-035851, rotation input from an operation handle is speeded up by a speed increasing mechanism and transmitted to a rotation shaft of a pinion gear so as to reduce an operation amount of the operation handle when a seat is operated on a lifting side or a lowering side.

In JP-A-2018-035847, when the rotation of the pinion gear is locked by the lock mechanism, a meshing state between the teeth is an incomplete meshing state depending on timing of the operation. In such a state, the rotation shaft of the pinion gear is rotated by an external force applied to the pinion gear (in particular, gravity) to approach a complete meshing state between the teeth. As a result, the height of the seat is slightly changed after the operation of the operation handle is finished.

SUMMARY

A lifter device according to the present disclosure includes: a pinion gear configured to mesh with an input gear of a link mechanism for lifting and lowering a seat; a rotation control device configured to control rotation of the pinion gear, the rotation control device including: a rotation shaft configured to rotate in synchronization with the pinion gear; a support member supporting the rotation shaft such that the rotation shaft is rotatable; a rotation drive mechanism configured to rotate the rotation shaft in a lifting direction or a lowering direction of the seat in accordance with an operation direction of an operation handle when the operation handle is operated to lift or lower the seat, the operation handle being configured to lift and lower the seat; and a lock mechanism configured to allow rotation of the rotation shaft when the operation handle is operated to lift or lower the seat, and configured to lock the rotation of the rotation shaft when the operation handle is in an operation-released state, the lock mechanism including: a first tooth provided on one of the rotation shaft and the support member; and a second tooth provided on the other one of the rotation shaft and the support member, the second tooth being configured to selectively mesh with the first tooth to lock relative rotation of the rotation shaft and the support member; and a speed increasing mechanism provided closer to the rotation shaft than a meshing portion of the first tooth and the second tooth in a rotation transmission path, the speed increasing mechanism being configured to transmit the rotation of the rotation shaft to one of the first tooth and the second tooth and configured to speed up the transmitted rotation of the rotation shaft, the one of the first tooth and the second tooth being located closer to the rotation shaft than the meshing portion in the rotation transmission path.

DETAILED DESCRIPTION

Hereinafter, embodiments of the present disclosure will be described with reference to the drawings.

First Embodiment

Figure 1:
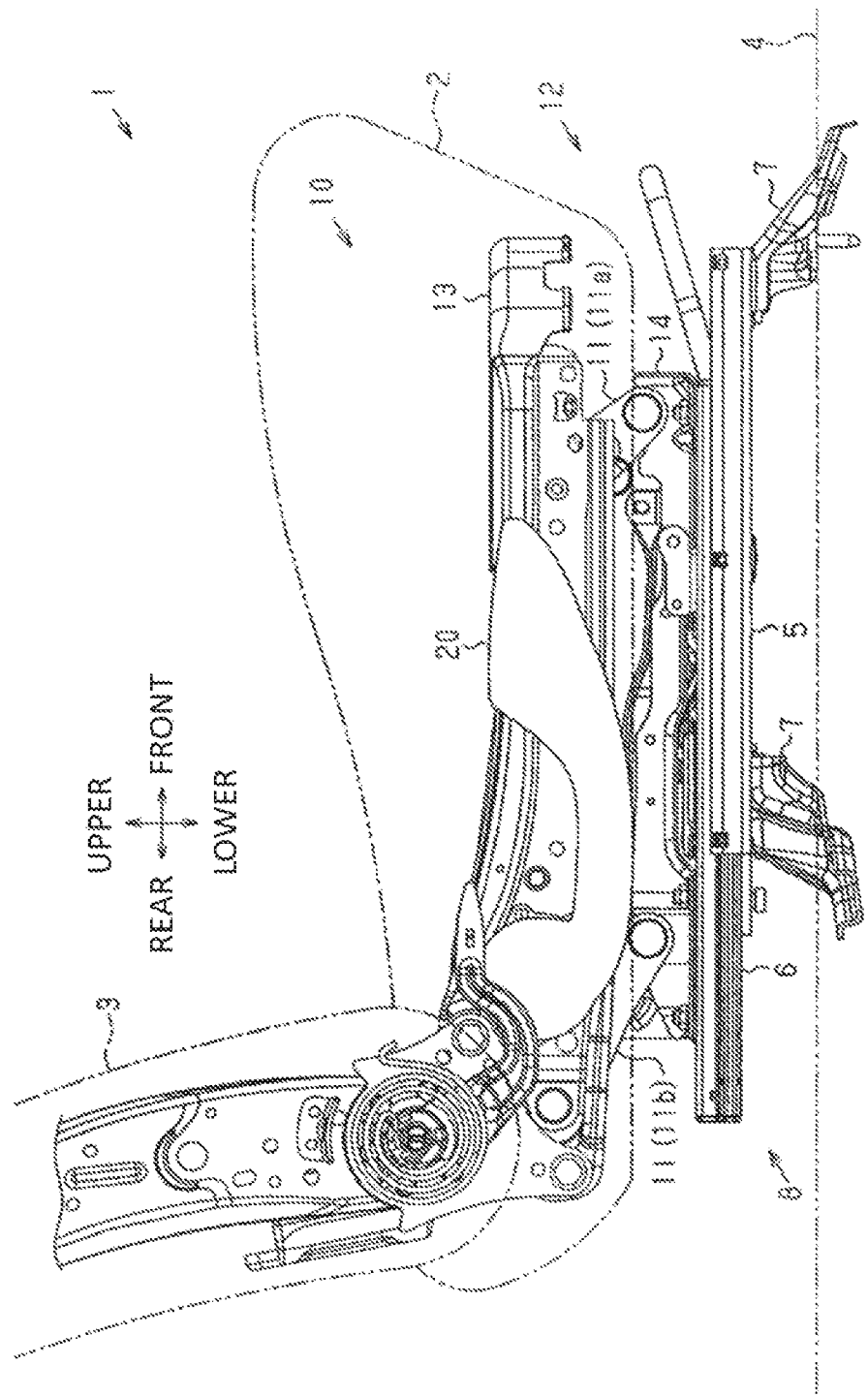
FIG. 1 is a side view showing a schematic configuration of a lifter device according to a first embodiment of the present disclosure.
Figure 2:
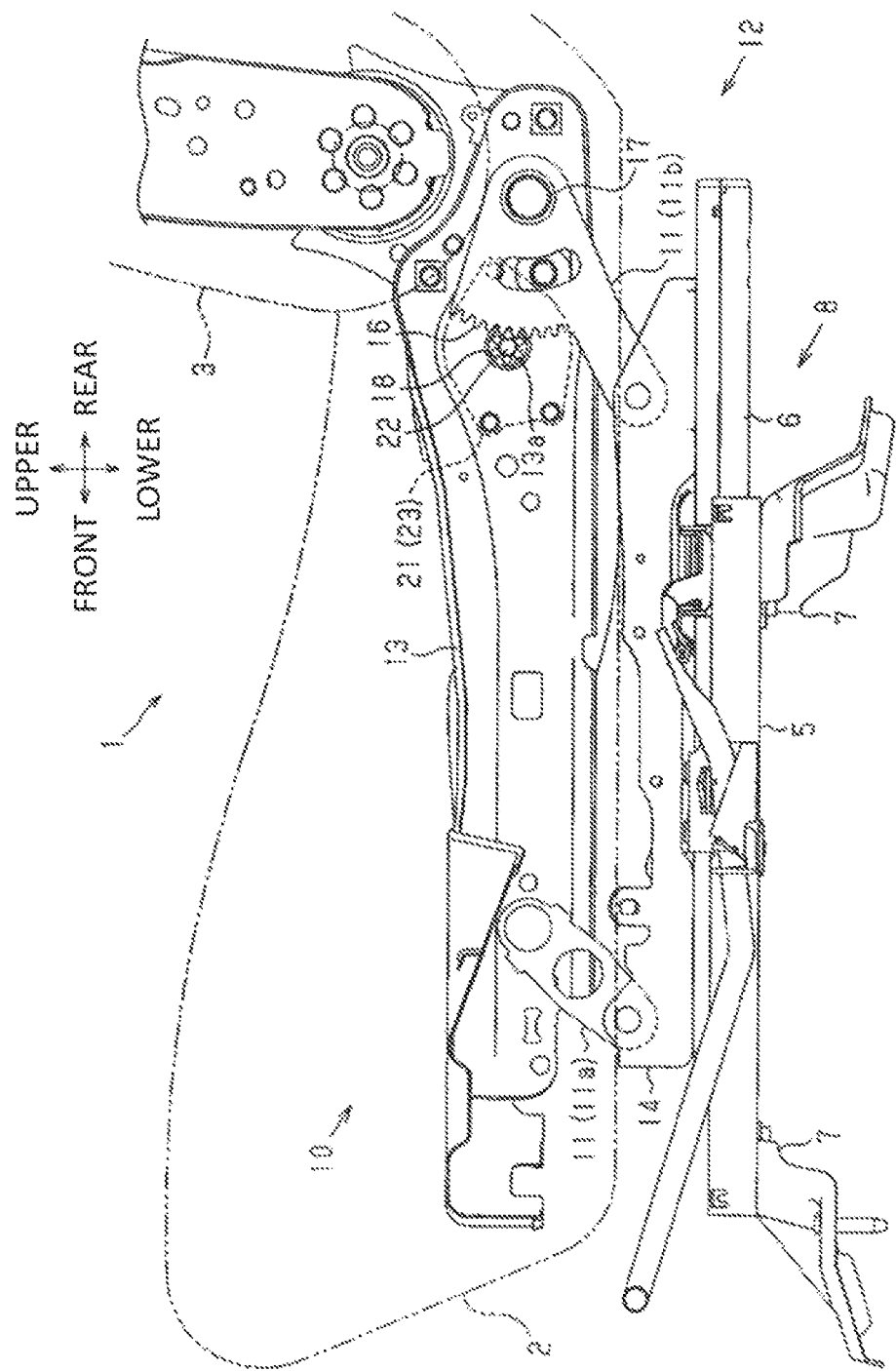
FIG. 2 is a side view of a structure on the same side as viewed from an inner side of a seat.
Figure 3:
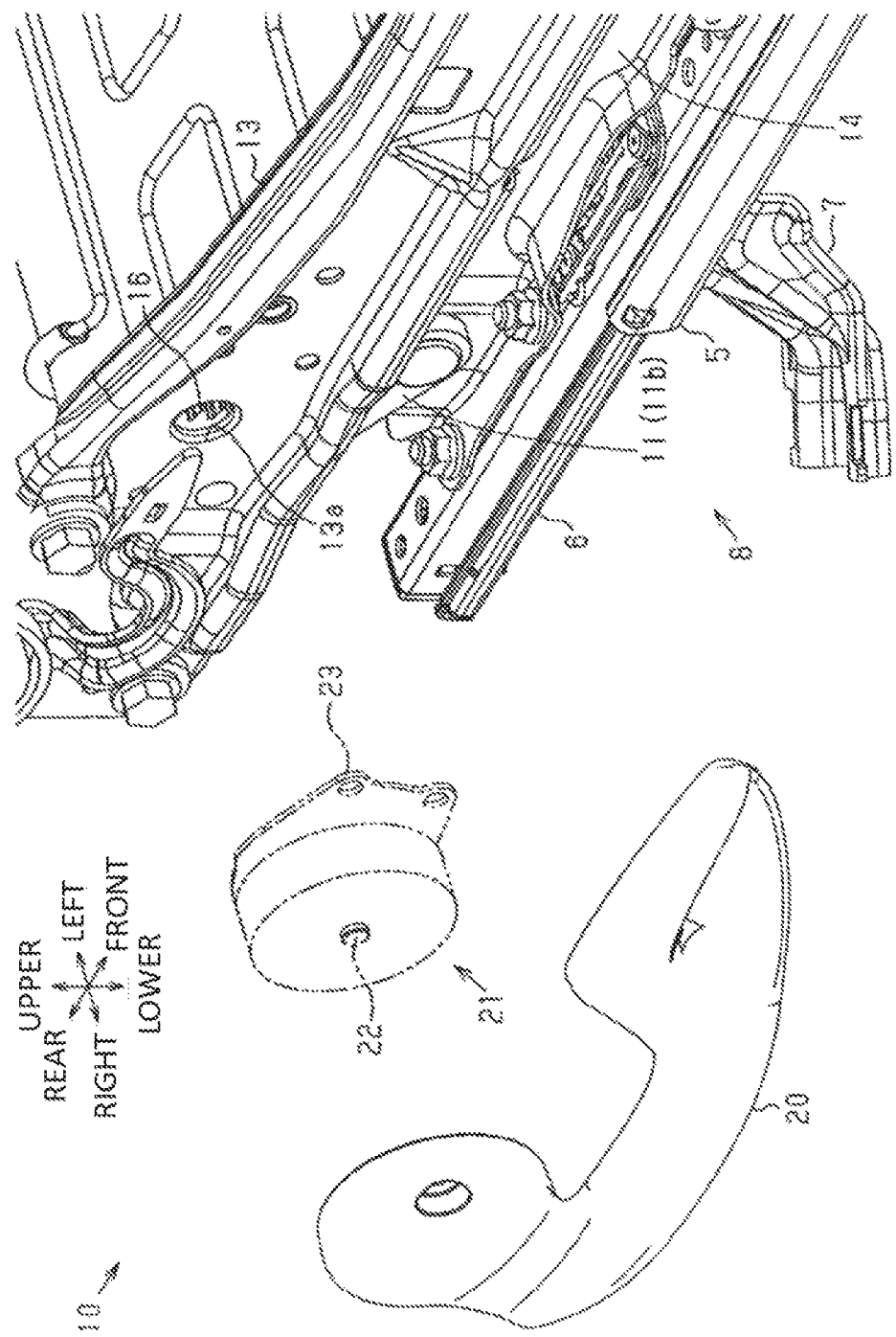
FIG. 3 is an exploded perspective view showing a state where an operation handle and a rotation control device are removed from a seat frame.

FIGS. 1 to 3 show an automobile seat 1 (hereinafter, simply referred to as a seat) to which a lifter device 10 according to a first embodiment of the present disclosure is applied. In the drawings, directions of parts in a state where the seat 1 is mounted to an automobile are indicated by arrows. In the following description, directions are described with reference to such directions. The same also applies to the drawings other than FIGS. 1 to 3.

Schematic Configuration of Lifter Device 10

As shown in FIG. 1, the seat 1 includes a seat back 3 serving as a backrest on a rear side of a seat cushion 2 serving as a seating portion. The seat back 3 is rotatable in a front-rear direction with respect to the seat cushion 2. The seat cushion 2 includes the lifter device 10 and a seat slide device 8 at a lower portion thereof, and is fixed to a vehicle floor 4 via a bracket 7.

As shown in FIG. 2, the seat slide device S is known in the related art and includes a pair of left and right upper rails 6 coupled to a pair of left and right lower rails 5 extending in the front-rear direction, so as to be slidable in the front-rear direction. The left and right lower rails 5 are respectively fixedly supported by a pair of front and rear brackets 7 fixed to the floor 4. The lifter device 10 is provided on the left and right upper rails 6.

As shown in FIGS. 2 and 3, the lifter device 10 includes a base member 14 fixed on the upper rails 6 and a plurality of link members 11 rotatably coupled to front and rear portions of the upper rails 6. A side frame 13, which is a frame member of the seat cushion 2, the base member 14, and the link members 11 constitute a link mechanism 12 that is a four-joint link. Among the plurality of link members 11, a rear link 11b on a right rear side includes a sector gear 16 (corresponding to the "input gear" of the present disclosure) and is configured to be rotated in the front-rear direction by a pinion gear 18. A rotation shaft of the rear link 11b on the right rear side with respect to the side frame 13 is configured by a torque rod 17. A rear link on a left rear side (not shown) is configured to be rotated in synchronization with the rear link 11b by the torque rod 17.

The side frame 13 is penetrated by a through hole 13a for inserting the pinion gear 18. A rotation control device 21 is fixed to a right side wall of the side frame 13 such that the pinion gear 18 is inserted into the through hole 13a. The rotation control device 21 is rotatable forward and reversely by an operation handle 20 that is provided on a right side portion of the seat cushion 2 and extends in the front-rear direction. When the operation handle 20 is rotated upward from a neutral position, the rotation control device 21 rotates the rear link 11b in a direction in which the rear link 11b is erected from the base member 14. When the operation handle 20 is rotated downward from the neutral position, the rotation control device 21 rotates the rear link 11b in a direction in which the rear link 11b is laid down on the base member 14. With the configuration of the four-joint link as described above, a front link 11a is also rotated in response to the rotation of the rear link 11b such that a height position of the seat cushion 2 with respect to the floor 4 is adjusted in response to the operation of the operation handle 20.

Configuration of Rotation Control Device 21

Figure 4:
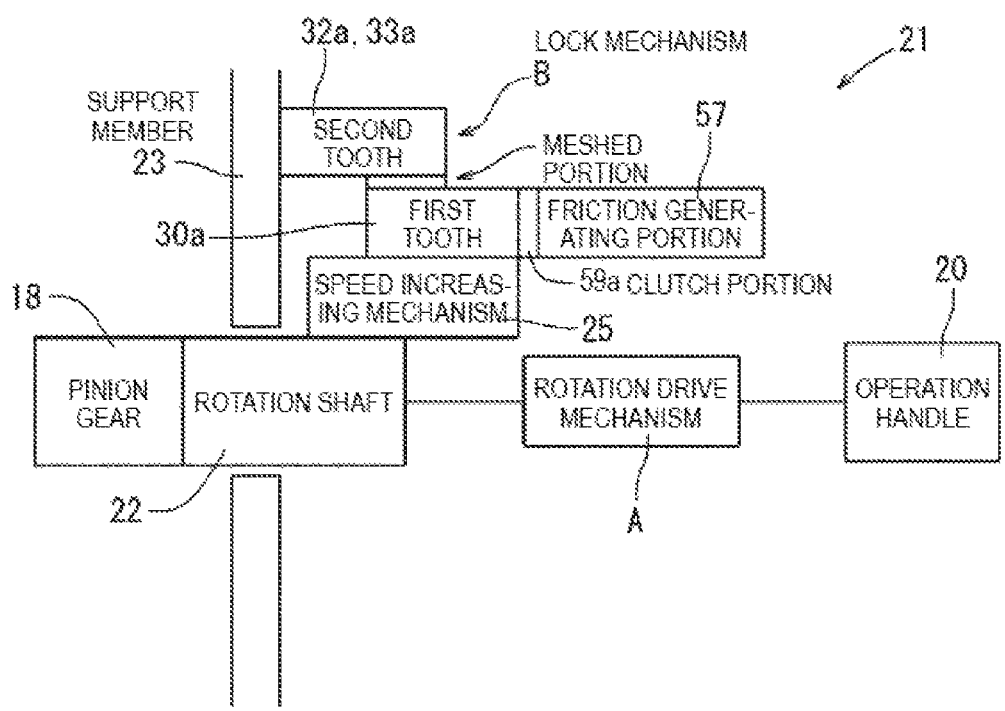
FIG. 4 is a functional block diagram showing a schematic configuration of the rotation control device of the first embodiment.

FIG. 4 shows an outline of a configuration of the rotation control device 21. A rotation shaft 22, which is integrated with the pinion gear 18, is rotatably supported by a support member 23. The rotation shaft 22 is coupled so as to be rotationally driven by a rotation drive mechanism A. The rotation drive mechanism A is coupled to the operation handle 20 and is rotationally driven in response to the operation of the operation handle 20.

Meanwhile, first teeth 30a are coupled to the rotation shaft 22 via a speed increasing mechanism 25. Therefore, the transmitted rotation of the rotation shaft 22 to the first teeth 30*a* is speeded up by, for example, about 5 times by the speed increasing mechanism 25 to rotate the first teeth 30*a* The first teeth 30*a* constitute a lock mechanism B together with second teeth 32*a*, 33*a*, and are selectively meshed with the second teeth 32*a*, 33*a*. The second teeth 32*a*, 33*a* are coupled to the support member 23. The meshing between the first teeth 30*a* and the second teeth 32*a*, 33*a* is released when the operation handle 20 is operated. When the operation handle 20 is not operated, the first teeth 30*a* and the second teeth 32*a*, 33*a* are meshed with each other, and the lock mechanism B is thus in a locked state.

A friction generating portion 57 is coupled to the first teeth 30*a* via a clutch portion 59*a*. When the friction generating portion 57 is coupled to the first teeth 30*a* by the clutch portion 59*a*, a predetermined frictional force is applied to rotation of the first teeth 30*a* to restrain the rotation of the first teeth 30*a*. When the operation handle 20 is operated in a direction in which the seat is lowered, the clutch portion 59*a* couples the friction generating portion 57 to the first teeth 30*a*. When the operation handle 20 is not operated and when the operation handle 20 is operated in a direction in which the seat 1 is lifted, the clutch portion 59*a* releases the coupling between the friction generating portion 57 and the first teeth 30*a*.

With the above configuration, when the operation handle 20 is operated to lower the seat 1, the rotation shaft 22 is rotated by the rotation drive mechanism A, and the seat 1 is lowered. At this time, although the lock mechanism B is unlocked and the first teeth 30*a* are speeded up by the speed increasing mechanism 25, since the clutch portion 59*a* couples the friction generating portion 57 to the first teeth 30*a*, rotation of the first teeth 30*a* is restrained. Therefore, rotation of the rotation shaft 22 is also restrained, and a lowering speed of the seat 1 is reduced. When the seat 1 is lowered, gravity applied to the seat 1 also acts in a direction in which the seat 1 is lowered in addition to the operation force from the operation handle 20, a function of the friction generating portion 57 restrains the lowering speed of the seat 1 such that the seat 1 is not lowered faster than the operation of the operation handle 20.

When the operation of the operation handle 20 in the direction in which the seat 1 is lowered is finished, the lock mechanism B is in the locked state, and the clutch portion 59*a* separates the friction generating portion 57 from the first teeth 30*a*. At this time, the first teeth 30*a* and the second teeth 32*a*, 33*a* transfer into a meshing state but are not completely meshed, so that the first teeth 30*a* are rotated due to the gravity of the seat 1 via the rotation shaft 22 and the speed increasing mechanism 25. When the first teeth 30*a* and the second teeth 32*a*, 33*a* are completely meshed, the rotation of the first teeth 30*a* is stopped. Such rotation of the first teeth 30*a* causes a problem that the seat 1 is slightly lowered when the operation of the operation handle 20 is finished, as described above as the problem in the related art. However, in the case of the first embodiment, when the rotation of the first teeth 30*a* is transmitted to the rotation shaft 22 via the speed increasing mechanism 25, the rotation is reduced to, for example, about one fifth, and an amount of lowering of the seat 1 is less as compared with an amount of rotation of the first teeth 30*a*. In addition, when a load applied to the seat 1 is transmitted from the rotation shaft 22 to the first teeth 30*a* via the speed increasing mechanism 25, the transmitted load is reduced in accordance with speed increasing, and noise or shock generated at the time when the first teeth 30*a* and the second teeth 32*a*, 33*a* are completely meshed is reduced as compared with a case where rotation speed is not speeded up.

When the operation handle 20 is operated to lift the seat 1, the clutch portion 59*a* separates the friction generating portion 57 from the first teeth 30*a*, thereby preventing the operation force of the operation handle 20 from increasing. That is, when the seat 1 is lifted, the seat 1 is lifted against the gravity applied to the seat 1 as opposed to lowering the seat 1, so that the operation force of the operation handle 20 is increased. However, since a frictional force of the friction generating portion 57 is not applied to the rotation of the first teeth 30*a*, the operation force does not become larger than necessary.

When the operation of lifting the seat 1 is finished, the first teeth 30*a* is rotated to approach a complete meshing state between the first teeth 30*a* and the second teeth 32*a*, 33*a* in the same manner as when the operation of lowering the seat 1 is finished. In this case, a lowering amount of the seat 1 is reduced due to the function of the speed increasing mechanism 25 while noise and shock are also reduced.

A specific example of the rotation control device 21 will be described below.

Figure 6:
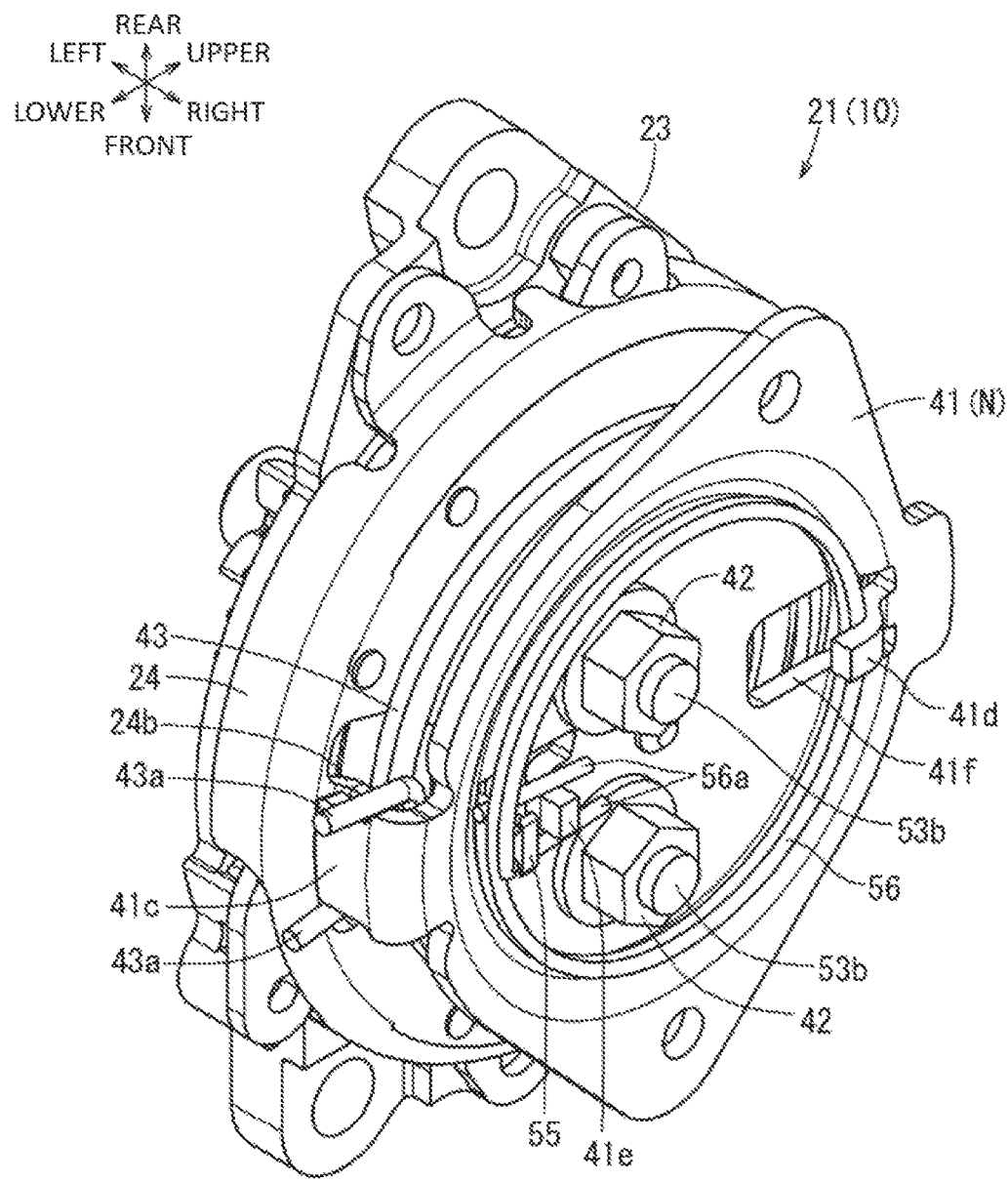
FIG. 6 is a perspective view of the rotation control device of the first embodiment as viewed from an outer side of the seat.
Figure 7:
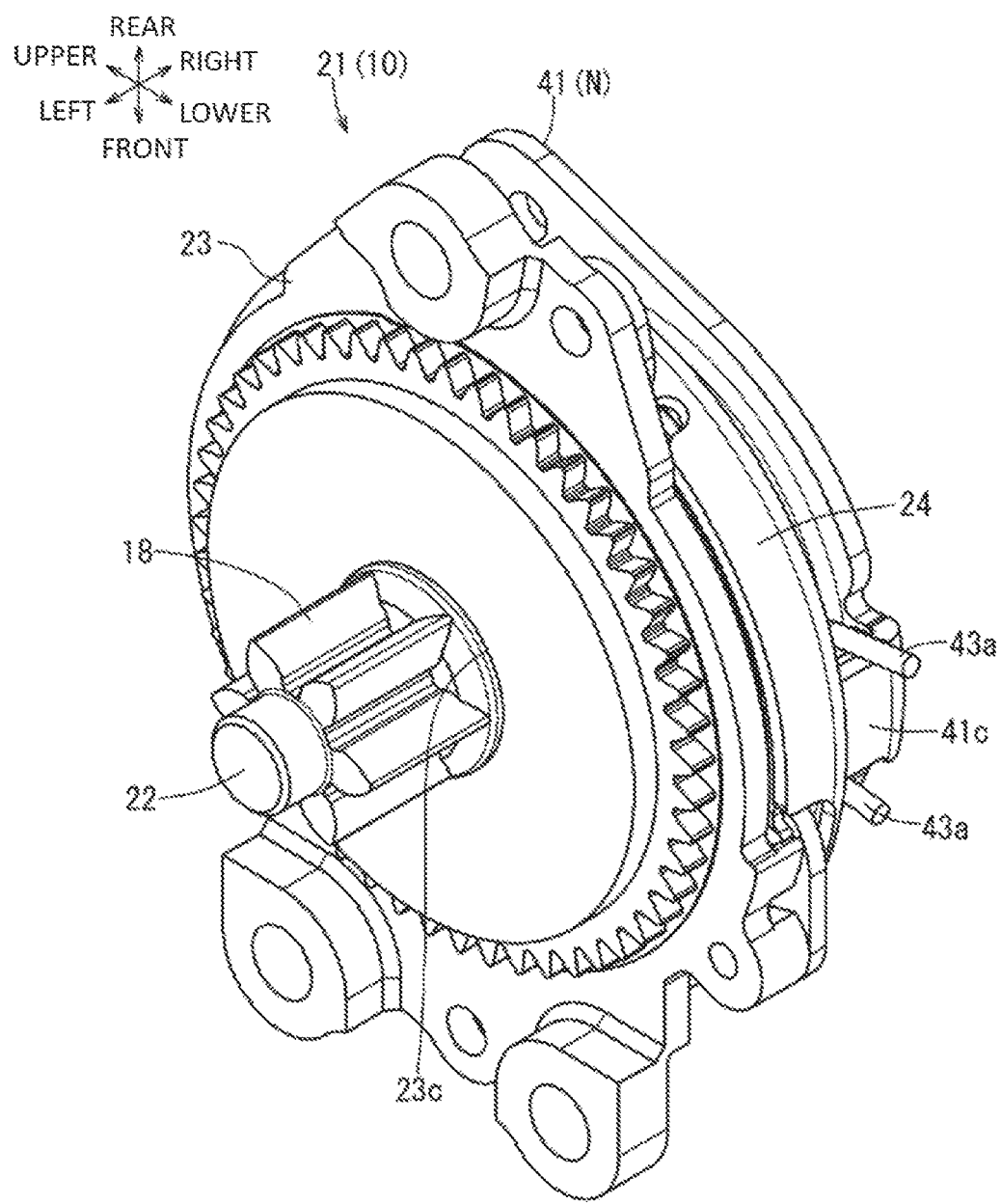
FIG. 7 is a perspective view of the rotation control device of the first embodiment as viewed from the inner side of the seat.
Figure 8:
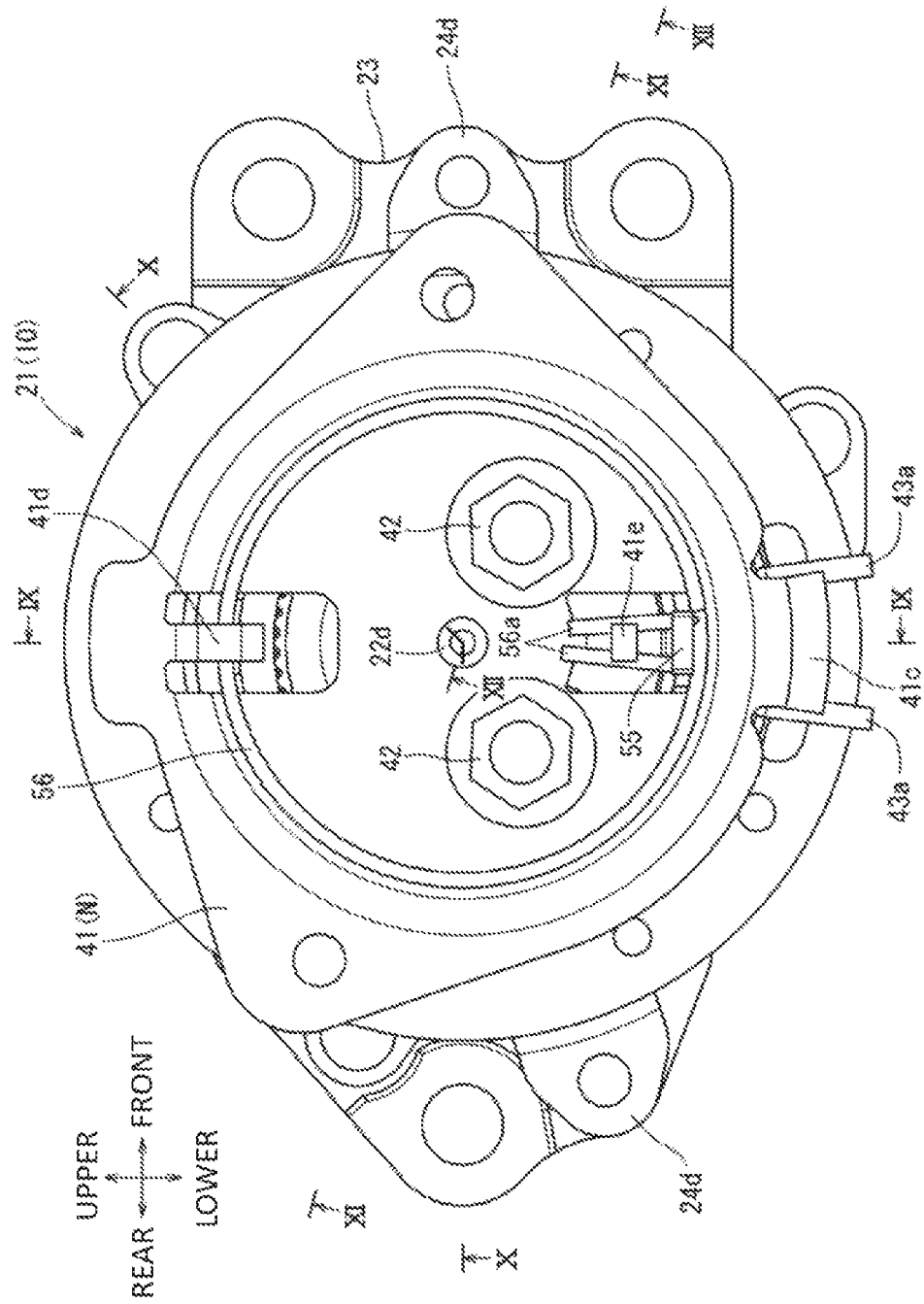
FIG. 8 is a front view of the rotation control device of the first embodiment as viewed from the outer side of the seat.

FIGS. 6 to 8 show a state where the rotation control device 21 is removed from the seat cushion 2. Hereinafter, a configuration of the rotation control device 21 will be described with reference to FIGS. 6 to 26. For the reference numerals of the constituent members of the rotation control device 21 to be described below, reference will be made to any of FIGS. 6 to 26 as appropriate.

The rotation control device 21 is assembled such that the rotation shaft 22 penetrates through a center hole 23*c* of the support member 23, which serves as a base, from a right side, and the pinion gear 18 protrudes from a left side surface of the support member 23. The support member 23 is fixed to the side frame 13 in a state where the pinion gear 18 penetrates through the through hole 13*a* of the side frame 13 (see FIG. 3).

A right side surface of the support member 23 is formed into a circular container shape as a whole by stamping a guide recessed portion 23*b* on a left side. A carrier 28, which is a planetary gear mechanism, is spline-coupled to an outer periphery of the rotation shaft 22, and is accommodated in the guide recessed portion 23*b*. The planetary gear mechanism constitutes the speed increasing mechanism 25. The planetary gear mechanism includes three planetary gears 27, a sun gear 29 rotated while being surrounded by the planetary gears 27, and the carrier A. An internal gear 26 is formed on an inner peripheral surface of the guide recessed portion 23*b* to mesh with the three planetary gears 27. The sun gear 29 is formed integrally with a rotation center of a sun gear plate 29*a* as a single-piece member. An outer peripheral side of the sun gear plate 29*a* is fitted to an inner peripheral side of a circular ring-shaped lock plate 30. A plurality of protrusions 29*b* formed on an outer periphery of the sun gear plate 29*a* mesh with the internal teeth 30*a* of the lock plate 30, and the sun gear plate 29*a* and the lock plate 30 are thus integrally coupled in a rotation direction. Accordingly, when the sun gear 29, which serves as output of the speed increasing mechanism 25, is rotated, the lock plate 30 slidably rotates on the right side surface of the support member 23.

A circular ring-shaped friction spring 58 and a pressing plate 59 are provided on a right side surface of the lock plate 30 so as to be sequentially overlapped with each other in a face-to-face manner. The friction spring 58 is made of a spring material and is curved to form three waveforms on a circumference thereof, and a wave-shaped surface thereof is elastically deformable in a left-right direction. Engagement claws 58a are formed to protrude to an outer peripheral side at three protruding portions of the wave-shaped surface of the friction spring 58, the three protruding portions being in contact with the right side surface of the lock plate 30. A pair of the engagement claws 58a is provided at each of the three protruding portions, and the pairs of engagement claws 58a are engaged so as to sandwich three engagement protrusions 23d of the support member 23 in rotation directions thereof. Three protruding portions 58b protruding rightward on the wave-shaped surface of the friction spring 58 abuts against a pressing surface 59b of the pressing plate 59 so as to be pressed against the same. The pressing surface 59b protrudes leftward from a general surface of the pressing plate 59. On a right side surface of the pressing plate 59, protrusions 59c are formed at three positions on an opposite surface of the pressing surface 59b. The protrusion 59c is fitted into a through hole 24f of a cover 24, which will be described below, to fix the pressing plate 59 in the rotation direction.

The clutch portion 59a is provided adjacent to the three protrusions 59c on the right side surface of the pressing plate 59. As shown in an enlarged view in FIG. 17, the clutch portion 59a is a member placed rotatably around one end thereof on the right side surface of the pressing plate 59 along a ring shape of the pressing plate 59, and a protrusion 59d is formed on one end portion, which serves as a rotation center, to protrude rightward. As shown by a solid line in FIG. 17 (a state where the clutch portion 59a is separated from the pressing plate 59), an abutting surface 59f is formed toward the right side surface of the pressing plate 59 at the other end (rotation end portion) of the clutch portion 59a. Similarly to the protrusion 59c, the protrusion 59d is fitted into the through hole 24f of the cover 24 to be described below, and the clutch portion 59a is rotatably supported around the protrusion 59d. A cam surface 59e is formed on a portion of the right side surface of the pressing plate 59 where the abutting surface 59f of the clutch portion 59a abuts. The cam surface 59e is a spiral surface centered on an axis of a rotation axis (protrusion 59d) of the clutch portion 59a. The spiral surface is continuously bulged rightward from an inner peripheral side to an outer peripheral side of the pressing plate 59. A protruding portion 59g is formed on an inner peripheral side of the abutting surface 59f of the clutch portion 59a, and the protruding portion 59g protrudes toward the inner peripheral side of the ring shape of the pressing plate 59 when the clutch portion 59a is placed along the ring shape of the pressing plate 59.

Figure 16:
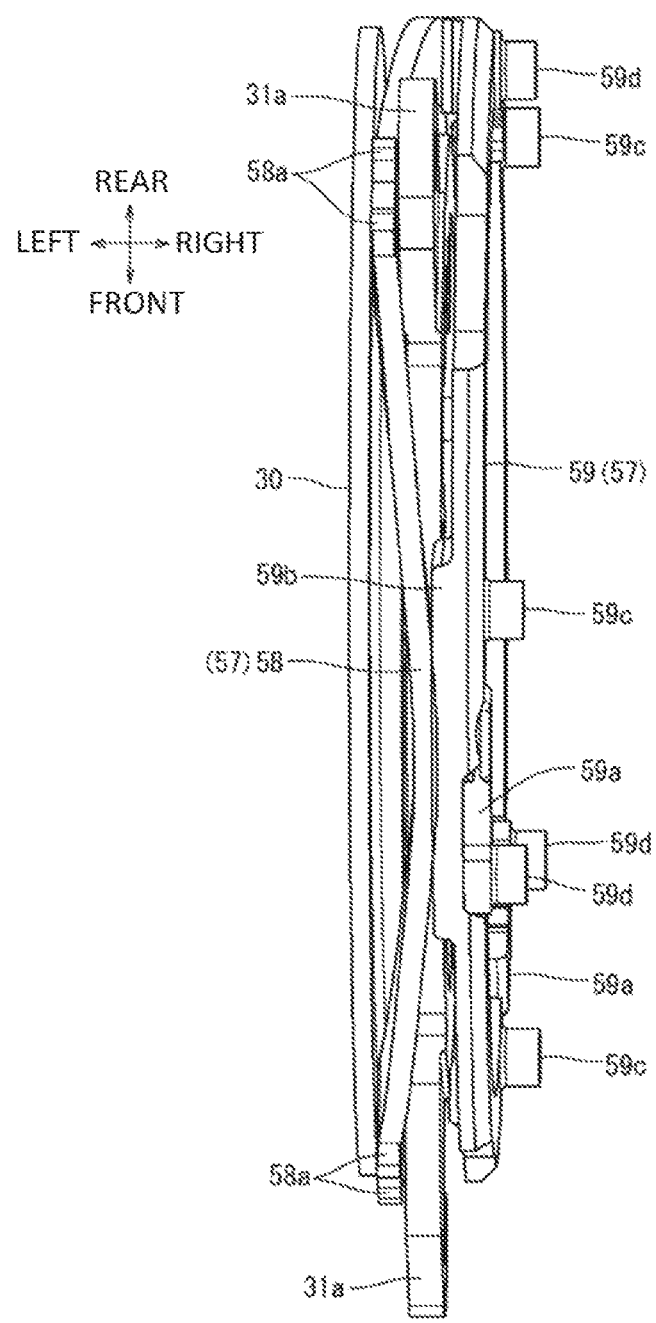
FIG. 16 is a perspective view showing an assembled state of a friction spring, a pressing plate, and a pole holder.
Figure 17:
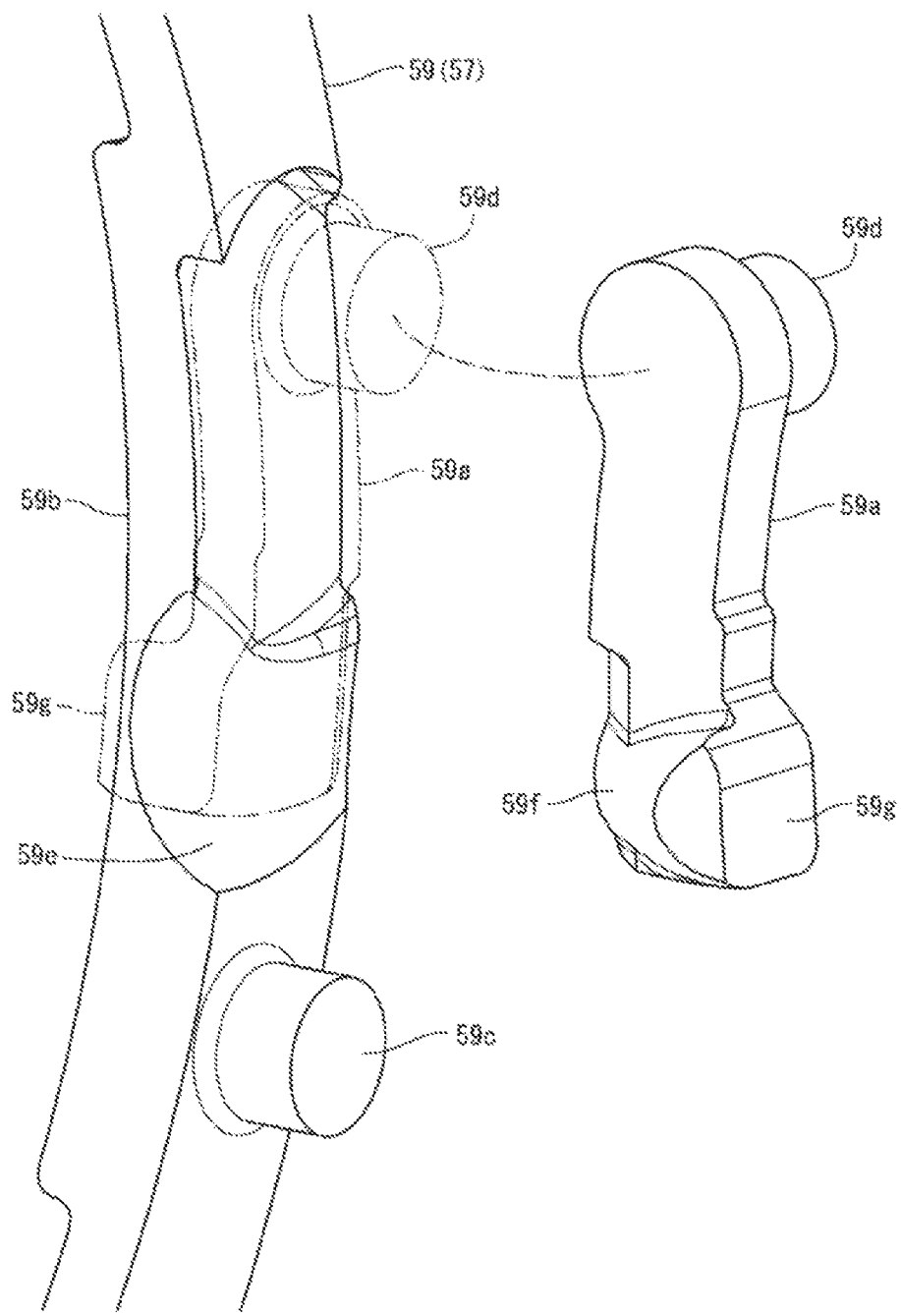
FIG. 17 is an enlarged perspective view of a clutch portion of the pressing plate.

A pole holder 31 is provided on a right side of the lock plate 30 so as to overlap the lock plate 30. The pole holder 31 has a ring shape similar to that of the lock plate 30. The pole holder 31 includes leg portions 31a, which protrudes toward an outer peripheral side, at three positions on an outer peripheral side thereof, and four poles 32, 33 on an inner peripheral side thereof. As shown in FIG. 16, each leg portion 31a is disposed in a gap between the pressing plate 59 and the friction spring 58, the gap being associated with the wave-shaped surface of the friction spring 58. The leg portions 31a are fixed to the engagement protrusions 23d of the support member 23 by bolts (see FIGS. 10 and 11). The poles 32 and the poles 33 which face each other in a radial direction of the lock plate 30 are rotatably supported by protrusions 31c of support pieces 31d protruding on the inner peripheral side of the lock plate 30. The poles 32, 33 are urged by torsion springs 31b such that the external teeth 32a, 33a (corresponding to the second tooth of the present disclosure) formed at tip ends thereof mesh with the internal teeth 30a of the lock plate 30 (corresponding to the first tooth of the present disclosure). When the external teeth 32a of the pole 32 mesh with the internal teeth 30a of the lock plate 30, clockwise rotation of the lock plate 30 as viewed from a right side is locked, and rotation of the rotation shaft 22 in the direction of lowering the seat 1 is locked. When the external teeth 33a of the pole 33 meshes with the internal teeth 30a of the lock plate 30, counterclockwise rotation of the lock plate 30 as viewed from the right side is locked, and the rotation of the rotation shaft 22 in the direction of lifting the seat 1 is locked.

An operation plate 34 is provided on the inner peripheral side of the pressing plate 59. The operation plate 34 is configured such that a ring-shaped outer periphery ring 34a and an inner periphery ring 34b which have a common center are formed to be dispersed in the radial direction. The outer periphery ring 34a and the inner periphery ring 34b are integrated by two coupling portions 34g. An outer peripheral surface 22a of the rotation shaft 22 is fitted into a through hole 34e located at a center of the inner periphery ring 34b, so that the operation plate 34 is rotatably supported with respect to the rotation shaft 22. Engagement portions 34c are formed on an inner peripheral side of the outer periphery ring 34a so as to face each other in the radial direction. Engagement pieces 53a of an inner lever 53 to be described below are inserted into the engagement portions 34c, and thus the operation plate 34 is rotationally driven by the inner lever 53. Three first operation portions 34d are formed in a peripheral direction on an outer periphery of the outer periphery ring 34a so as to protrude radially outward. Four second operation portions 34f are formed in the peripheral direction on an outer periphery of the inner periphery ring 34b so as to protrude radially outward.

Each first operation portion 34d of the outer periphery ring 34a is arranged to be adjacent to the clutch portion 59a of the pressing plate 59. When the operation plate 34 is rotated by the inner lever 53 in the direction in which the seat 1 is lowered, the protruding portion 59g of the clutch portion 59a is pressed by an outer peripheral surface of the first operation portion 34d on a radial direction outer side of the pressing plate 59. Therefore, the pressing plate 59 is moved in an axial direction of the rotation shaft 22 due to relative movement of the abutting surface 59f with respect to the cam surface 59e, and functions to be pressed against the friction spring 58. Each second operation portion 34f of the inner periphery ring 34b is arranged to be adjacent to each of the poles 32, 33 of the pole holder 31. When the operation plate 34 is rotated by the inner lever 53 in the direction in which the seat 1 is lowered or lifted, each of the poles 32, 33 is swung by an engagement end portion 34f1 of the second operation portion 34f, and the poles 32, 33 are released from a state of meshing with the internal teeth 30a of the lock plate 30.

A feed gear 36 is provided on a right side of the operation plate 34. The feed gear 36 is formed by stamping a disk from a right side to a left side, and a recessed portion 36a is formed on a right side surface thereof. Internal teeth 36b are formed on an inner peripheral surface of the recessed portion 36a. A spline fitting portion 36c, which is coupled to a spline 22b of the rotation shaft 22, is formed at a center of the recessed portion 36a.

The inner lever 53 is provided on a right side of the feed gear 36. A cover 24 and an outer lever 41 are sequentially covered on a right side of the inner lever 53. At this time, an outer peripheral surface 22c of the rotation shaft 22 is inserted into a center hole 53d of the inner lever 53, and an end portion 22d of the rotation shaft 22 is inserted into a center hole 24e of the cover 24 and a center hole 41b of the outer lever 41. Therefore, the inner lever 53, the cover 24, and the outer lever 41 are relatively rotatable around the rotation shaft 22.

Figure 15:
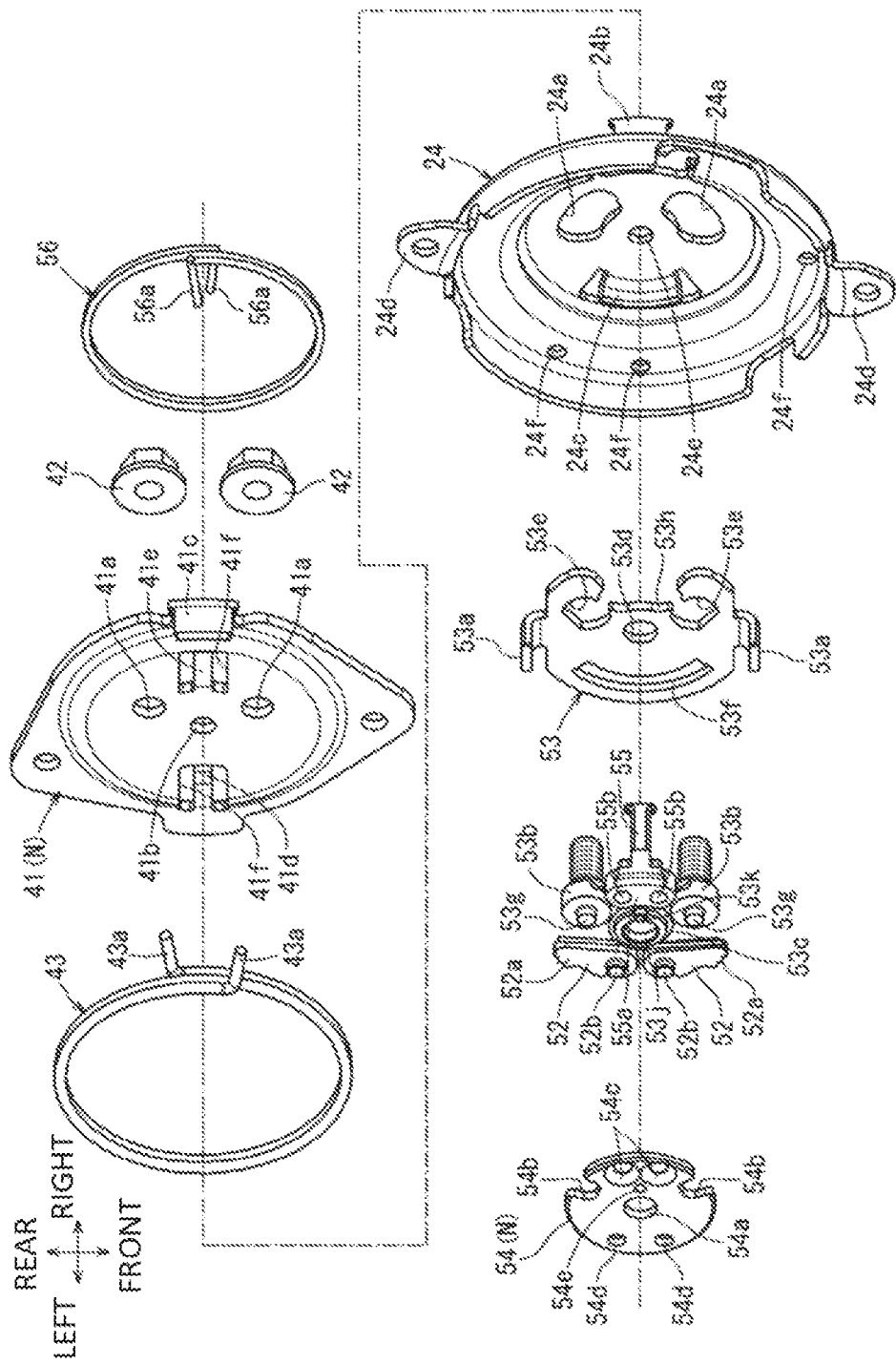
FIG. 15 is an exploded perspective view of a lever input portion in FIG. 14.

FIG. 15 shows a state where the inner lever 53, the cover 24, and the outer lever 41 are disassembled. The engagement pieces 53a, which are bent leftward, are formed at front and rear end portions of the inner lever 53. Fitting holes 53e are formed in front and rear of a lower side of the center hole 53d. A coupling pin 53b is fitted and fixed to each fitting hole 53e. A right side end portion of the coupling pin 53b is threaded. The right side end portion of the coupling pin 53b penetrates through a through hole 24a of the cover 24, further protrudes from a through hole 41a of the outer lever 41 and is fastened to the outer lever 41 by a nut 42.

Figure 9:
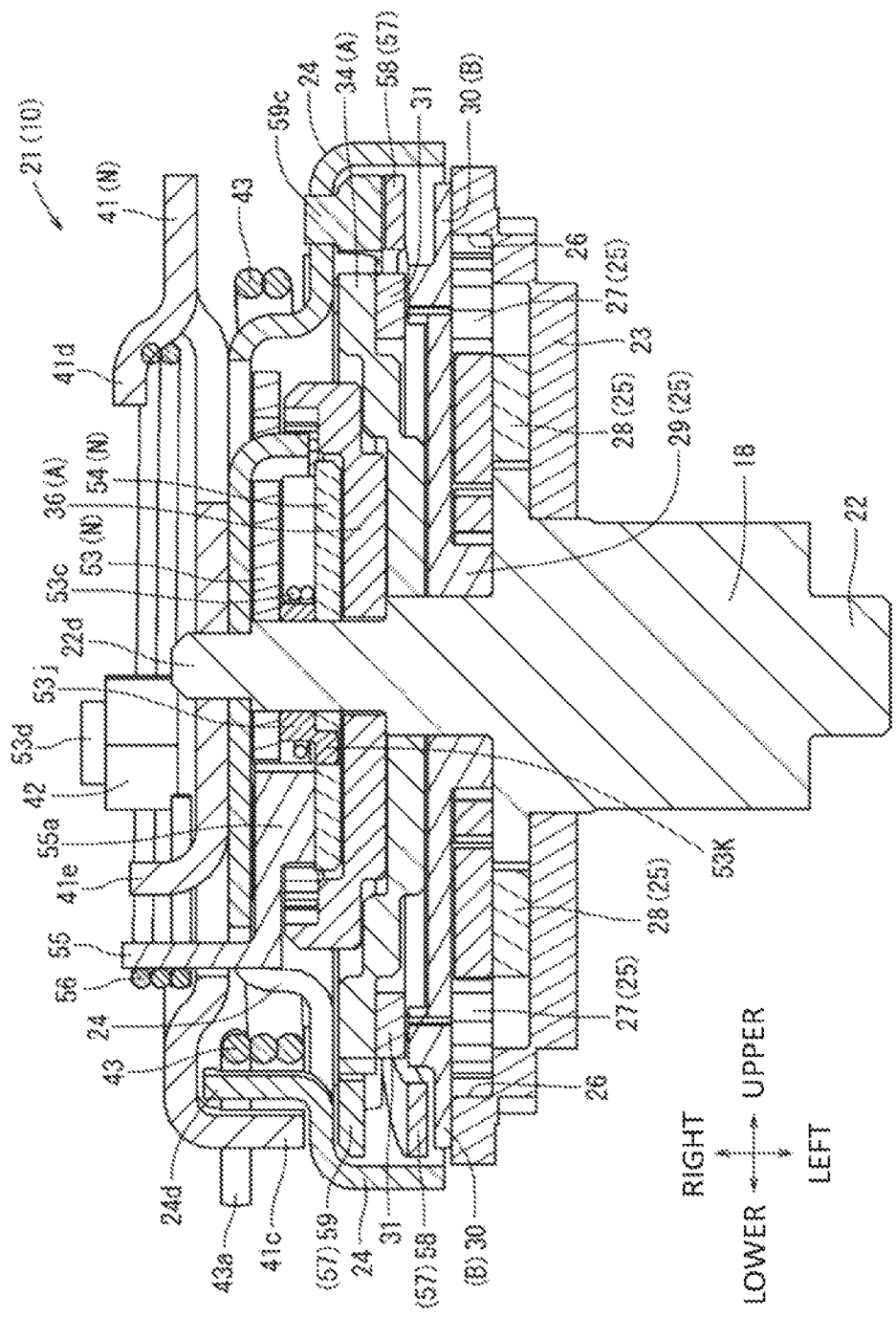
FIG. 9 is a cross-sectional view taken along line IX-IX of FIG. 8.
Figure 10:
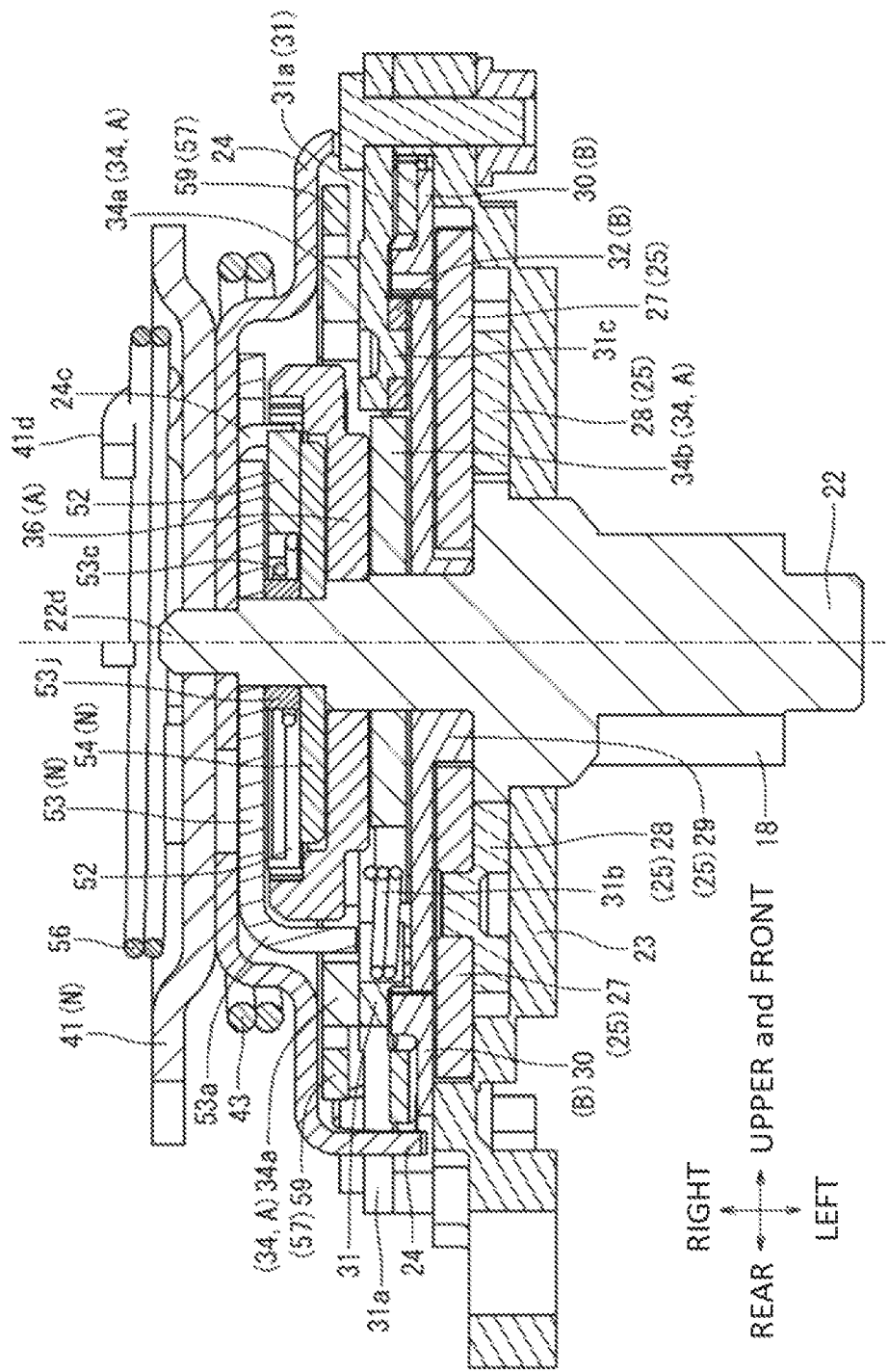
FIG. 10 is a cross-sectional view taken along line X-X of FIG. 8.
Figure 11:
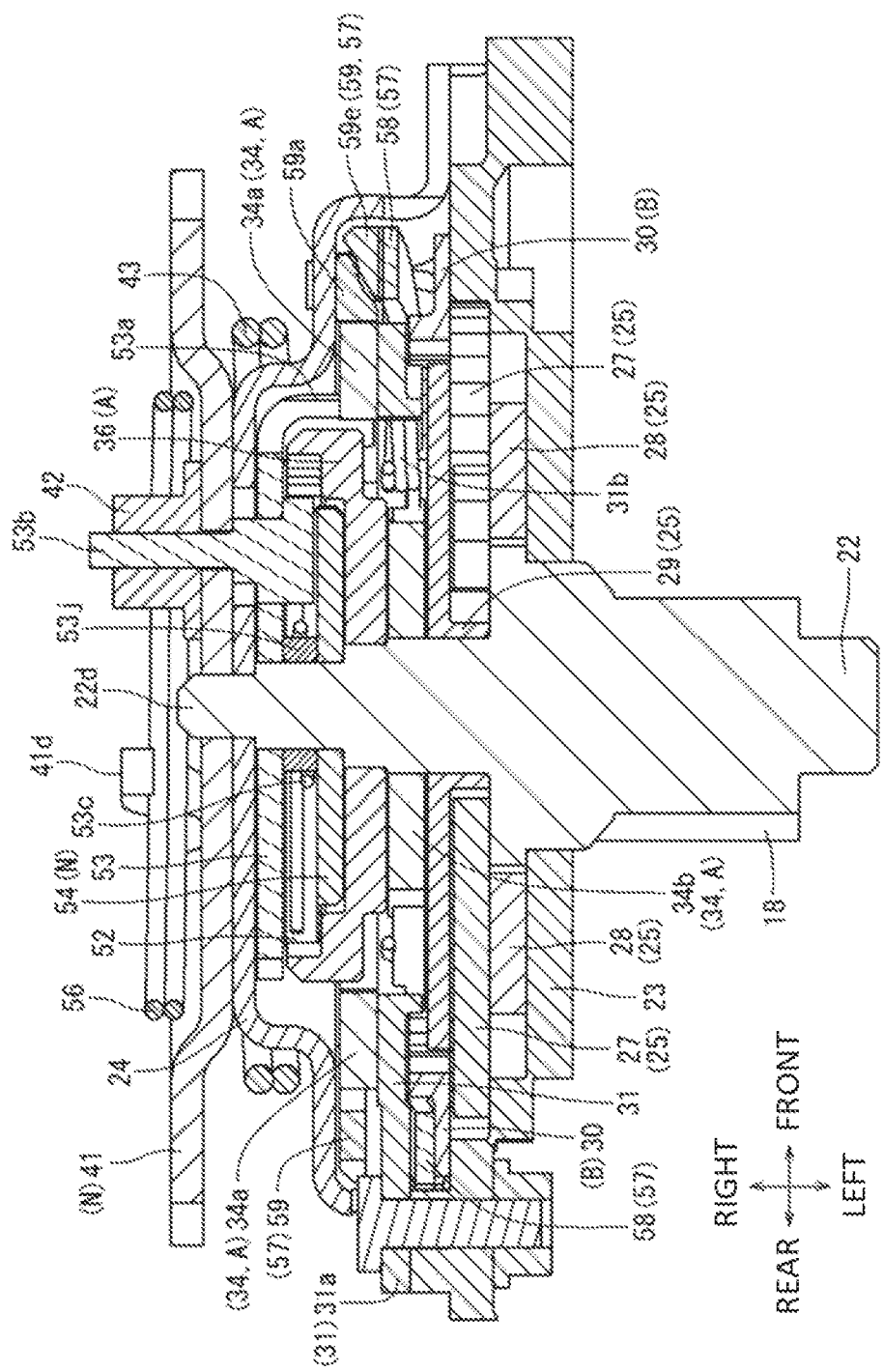
FIG. 11 is a cross-sectional view taken along line XI-XI of FIG. 8.
Figure 12:
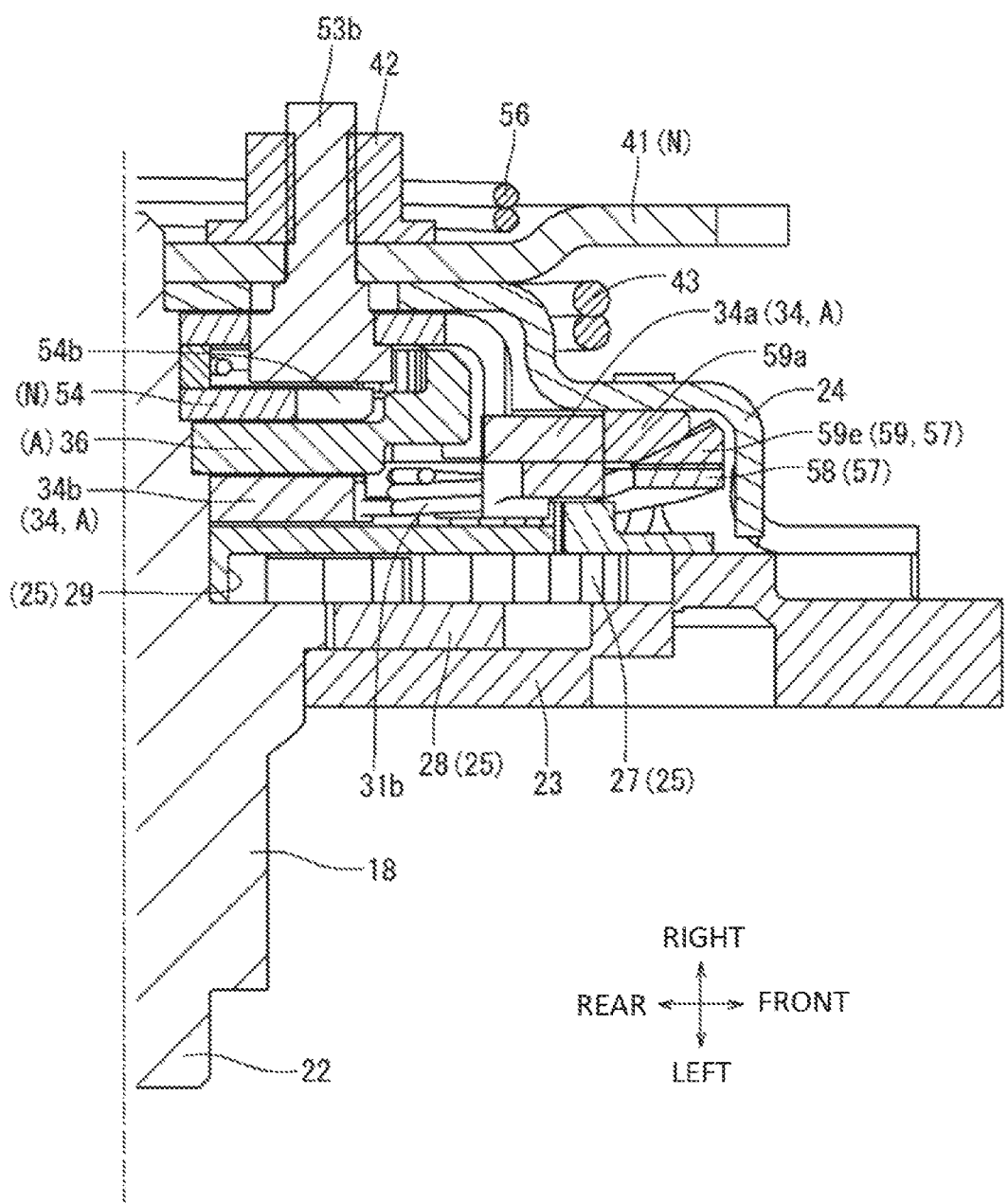
FIG. 12 is a cross-sectional view taken along line of FIG. 8.
Figure 13:
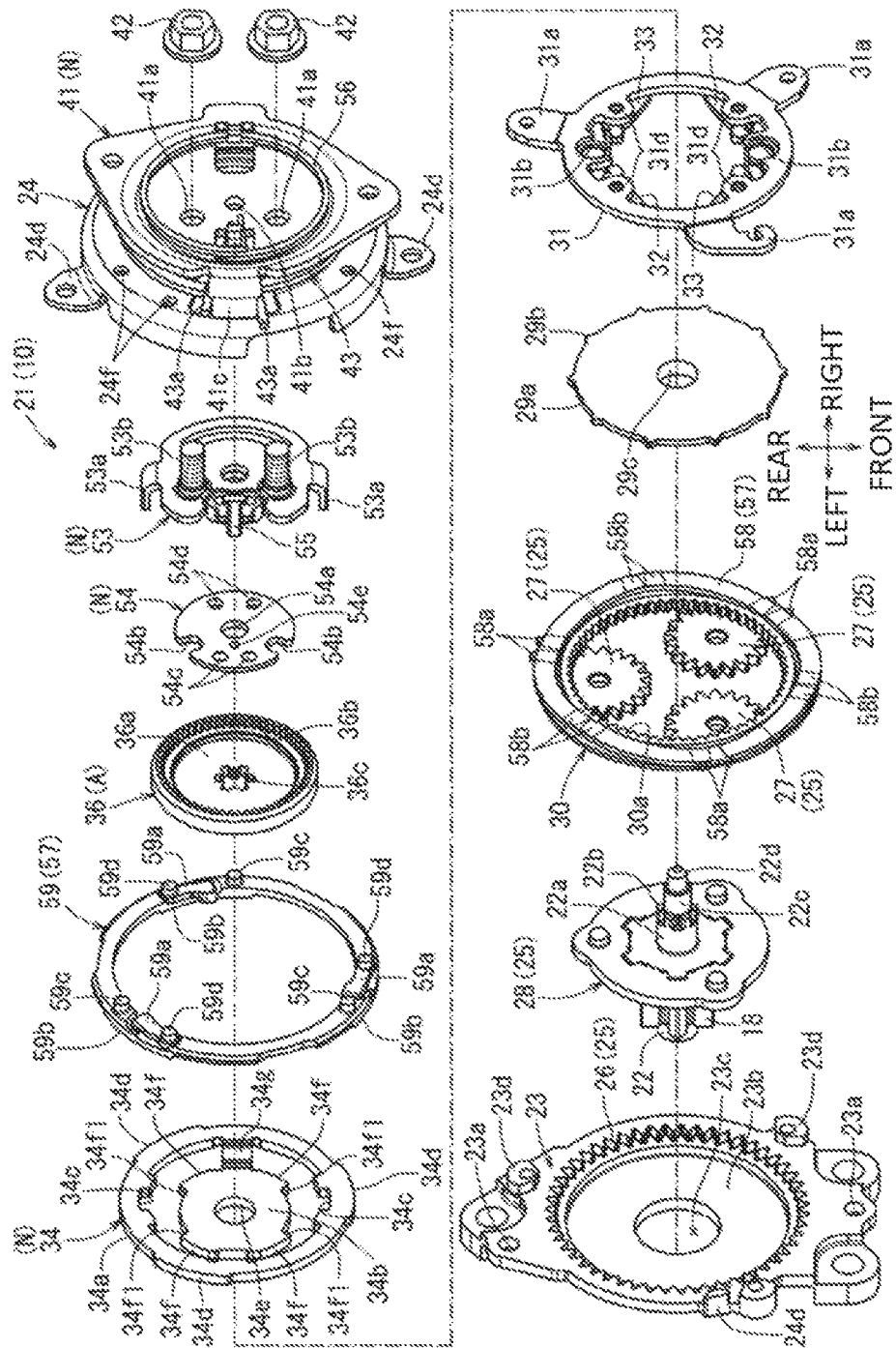
FIG. 13 is an exploded perspective view of the rotation control device of the first embodiment as viewed from the outer side of the seat.
Figure 14:
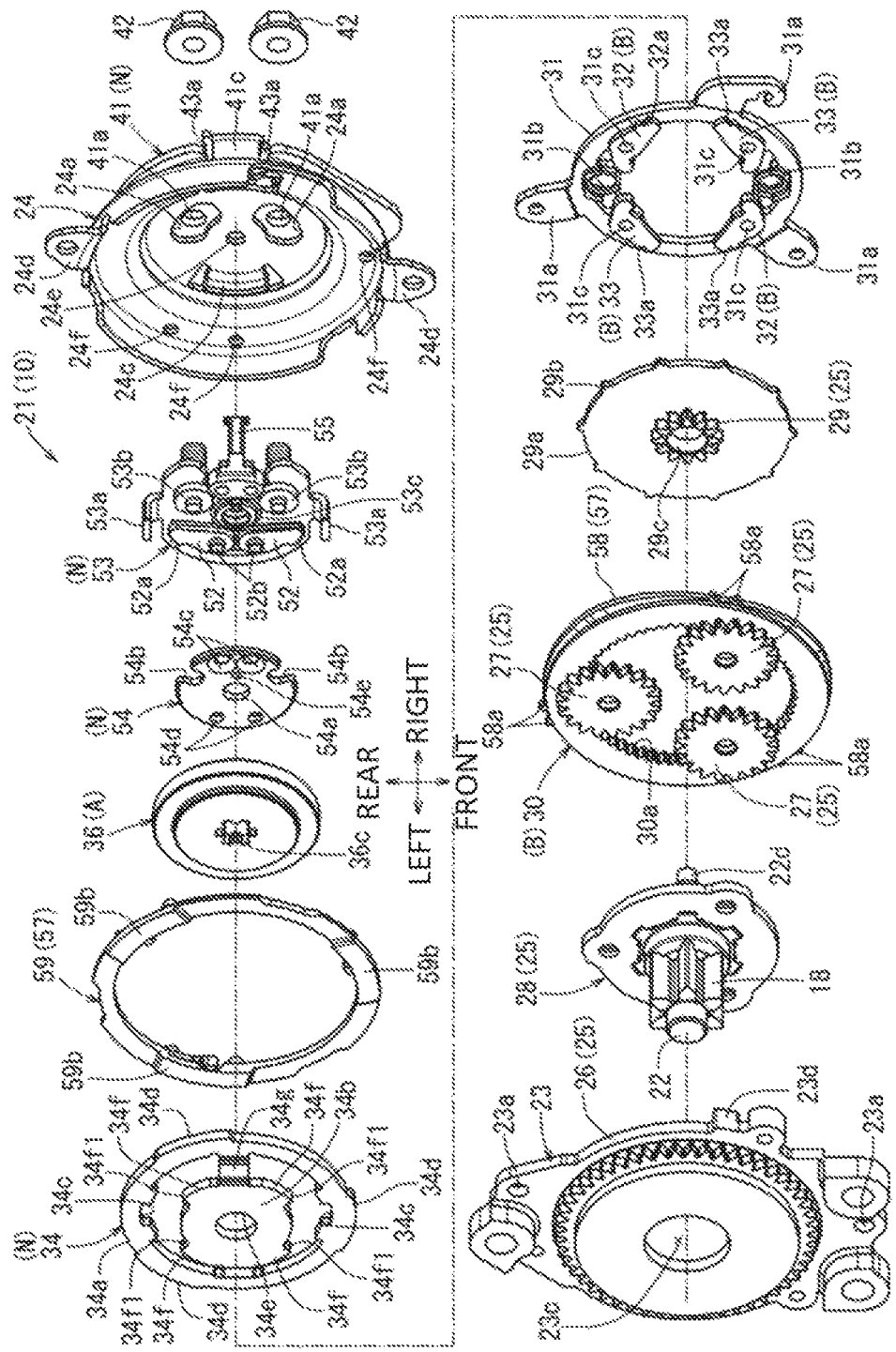
FIG. 14 is an exploded perspective view as viewed from the inner side of the same seat.

A lower side of a portion between the front and rear fitting holes 53e of the inner lever 53 is a notch 53h. A corner portion 55 is inserted into the notch 53h so as to be aligned with the coupling pin 53b. The corner portion 55 protrudes rightward from a right end portion of a base portion 55a which is held to be movable in the front-rear direction within the notch 53h. As shown in FIGS. 6 and 9, the corner portion 55 penetrates through a cut-and-raised hole 41f of the outer lever 41, protrudes rightward, and is arranged to be adjacent to an outer peripheral side of a cut-and-raised piece 41e of the outer lever 41. Both the corner portion 55 and the cut-and-raised piece 41e are sandwiched and urged by two end portions 56a of a ring-shaped torsion spring 56 such that the corner portion 55 and the cut-and-raised piece 41e are located at positions where the corner portion 55 and the cut-and-raised piece 41e are radially overlapped with each other as shown in FIGS. 6 and 9. Radial direction opposite sides of the two end portions 56a of the torsion spring 56 are crimped by another cut-and-raised piece 41d of the outer lever 41 and held on the outer lever 41.

A disk-shaped operation portion 54 is covered on the base portion 55a of the corner portion 55 from a left side. The operation portion 54 is fixed to the base portion 55a by fastening bolts (not shown), which are inserted into two through holes 54c, to screw holes 55b of the base portion 55a. The outer peripheral surface 22c of the rotation shaft 22 is inserted into a center hole 54a of the operation portion 54, and the operation portion 54 is thus rotatably supported by the rotation shaft 22. A protrusion 53g formed at a tip end of the coupling pin 53b of the inner lever 53 is inserted into a notch 54b of the operation portion 54. An outer diameter of the protrusion 53g is sufficiently smaller than a size of the notch 54b. Therefore, when the inner lever 53 is rotated in the direction in which the seat 1 is lowered as to be described below, rotation of the inner lever 53 is not transmitted to the operation portion 54 until the inner lever 53 has been rotated by 5.5 degrees, for example. On the other hand, when the inner lever 53 is rotated in the direction in which the seat 1 is lifted, the rotation of the inner lever 53 is not transmitted to the operation portion 54 until the inner lever 53 has been rotated by 3 degrees, for example. When the inner lever 53 has been rotated by such angles or more, the rotation of the inner lever 53 is transmitted to the operation portion 54 via the protrusion 53g.

A pair of feed claws 52 and a torsion spring 53c configured to urge the feed claws 52 to a neutral position are interposed between the inner lever 53 and the operation portion 54. The pair of feed claws 52 are arranged side by side in the front-rear direction on a left side surface of the inner lever 53, and engagement end portions 52a are formed on sides of the pair of feed claws 52 which are away from each other while hinge portions 52b are formed on sides which are close to each other. The hinge portions 52b of the pair of feed claws 52 are fitted in through holes 54d of the operation portion 54 such that the pair of feed claws 52 are rotatably supported around the hinge portions 52b. The torsion spring 53c is wound around a collar 53j covered around the outer peripheral surface 22c of the rotation shaft 22. Two ends of the torsion spring 53c are engaged with the pair of feed claws 52 to urge the engagement end portions 52a of the pair of feed claws 52 such that the engagement end portions 52a are pressed toward an outer peripheral side. A protrusion 53k, which protrudes on a left side surface of the collar 53j, is fitted into the through hole 54e of the operation portion 54. A cut-and-raised piece 24c of the cover 24 is inserted into an arc-shaped slit 53f of the inner lever 53 in a state where the cover 24 is covered thereon. The cover 24 is fixed by fastening a pair of leg portions 24d to through holes 23a on the support member 23.

Figure 18:
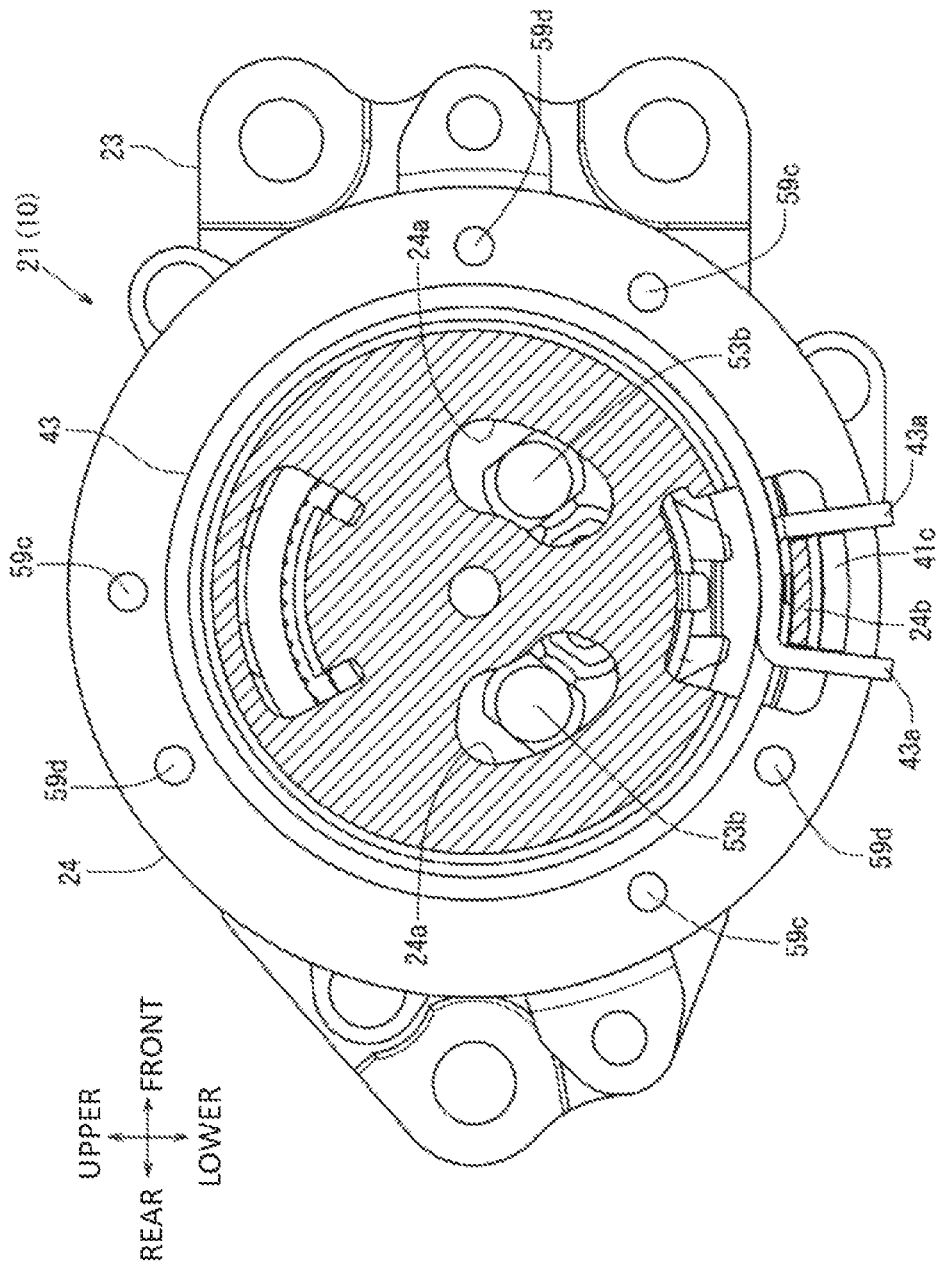
FIG. 18 is an explanatory diagram for explaining a stopper function of an outer lever.
Figure 19:
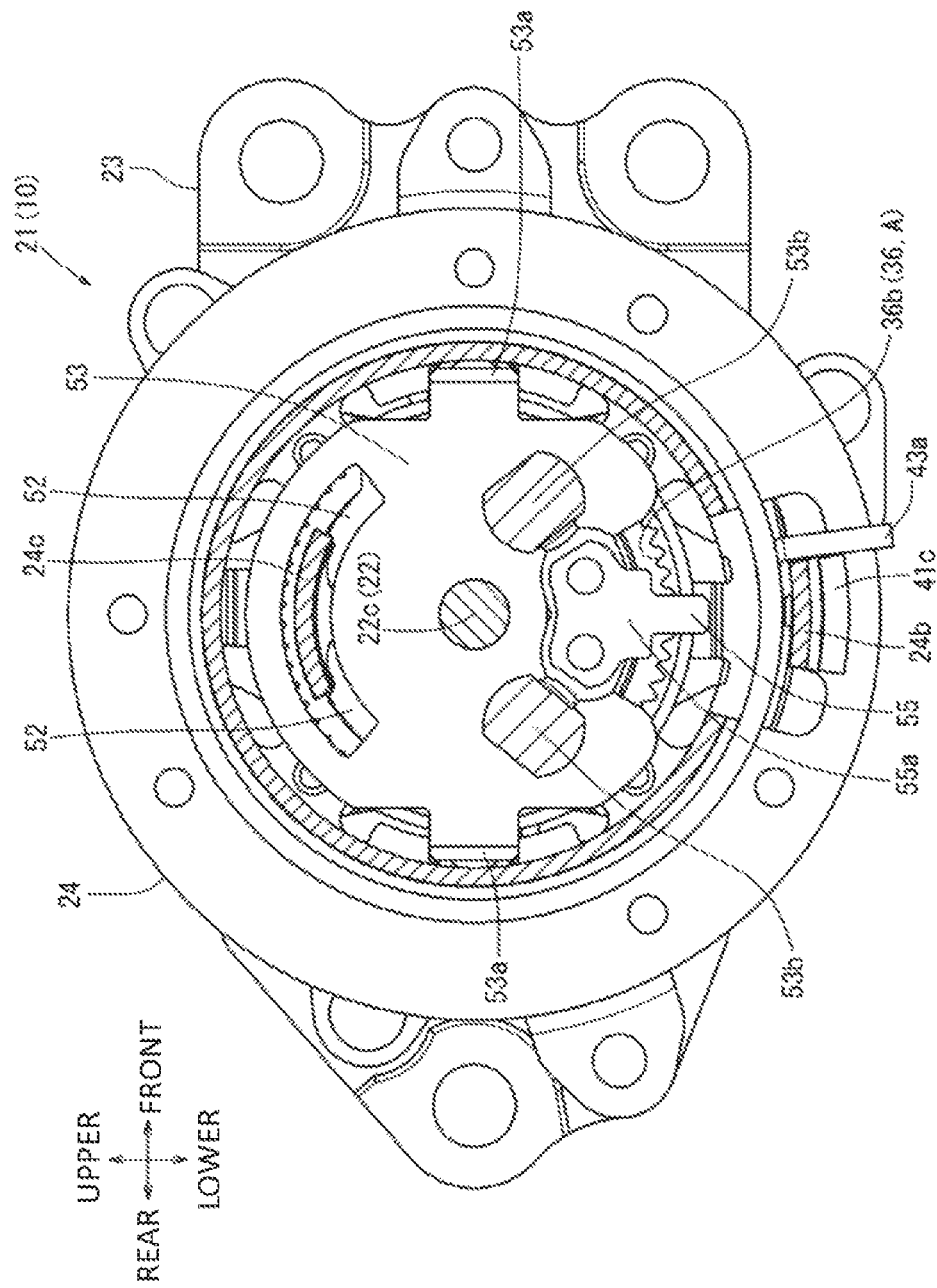
FIG. 19 is an explanatory diagram showing an assembled state of an inner lever.

Another engagement piece 41c is formed to be bent leftward on the outer peripheral side of the cut-and-raised piece 41e on the outer lever 41. As shown in FIGS. 6, 9, and 18, the engagement piece 41c is located on an outer peripheral side of a cut-and-raised piece 24b of the cover 24 in a state where the outer lever 41 is covered on a right side of the cover 24. A torsion spring 43 is wound around an outer peripheral side of the cover 24. Two side end portions 43a of the torsion spring 43 sandwich the engagement piece 41c and the cut-and-raised piece 24b from two sides, and urge the engagement piece 41c and the cut-and-raised piece 24b such that the engagement piece 41c and the cut-and-raised piece 24b are overlapped in a face-to-face manner. Accordingly, the torsion spring 43 always keeps the outer lever 41 at the neutral position when the outer lever 41 is not operated. Although not shown, the outer lever 41 is coupled to the operation handle 20 so as to be rotated by the operation handle 20.

In the above description, the outer lever 41, the inner lever 53, the operation portion 54, and the operation plate 34 correspond to an input member N of the present disclosure. The feed gear 36 corresponds to the rotation drive mechanism A of the present disclosure. Further, the poles 32, 33 and the lock plate 30 correspond to the lock mechanism B of the present disclosure.

Operation of Rotation Control Device 21
(Operation Handle 20 Not Operated)

Hereinafter, a height adjustment operation of the seat cushion 2 performed by the rotation control device 21 is described with reference to FIGS. 20, 24, and 27 to 33.

Figure 20:
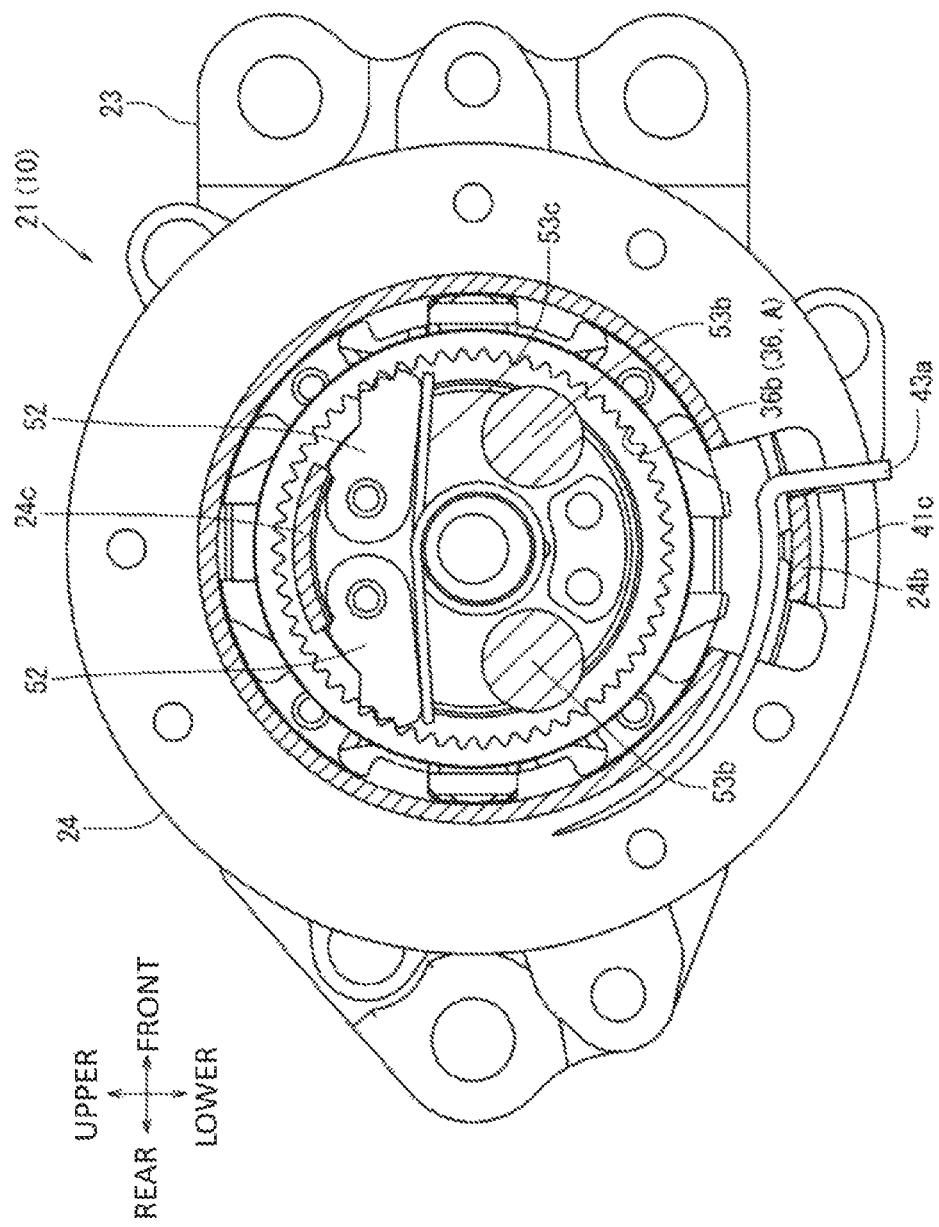
FIG. 20 is an explanatory diagram showing an assembled state of a feed claw of a feed mechanism.
Figure 21:
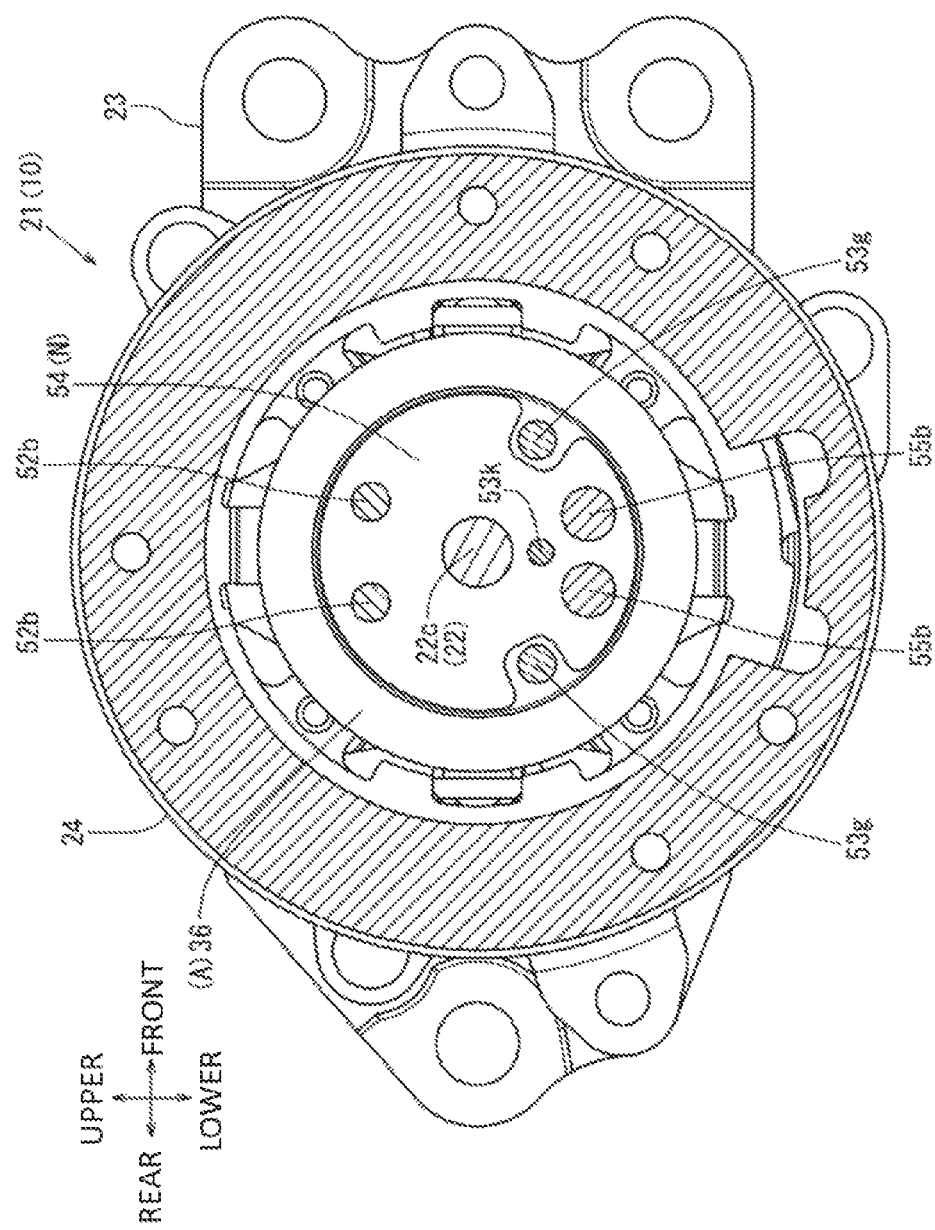
FIG. 21 is an explanatory diagram showing an assembled state of an operation portion of the feed mechanism.
Figure 22:
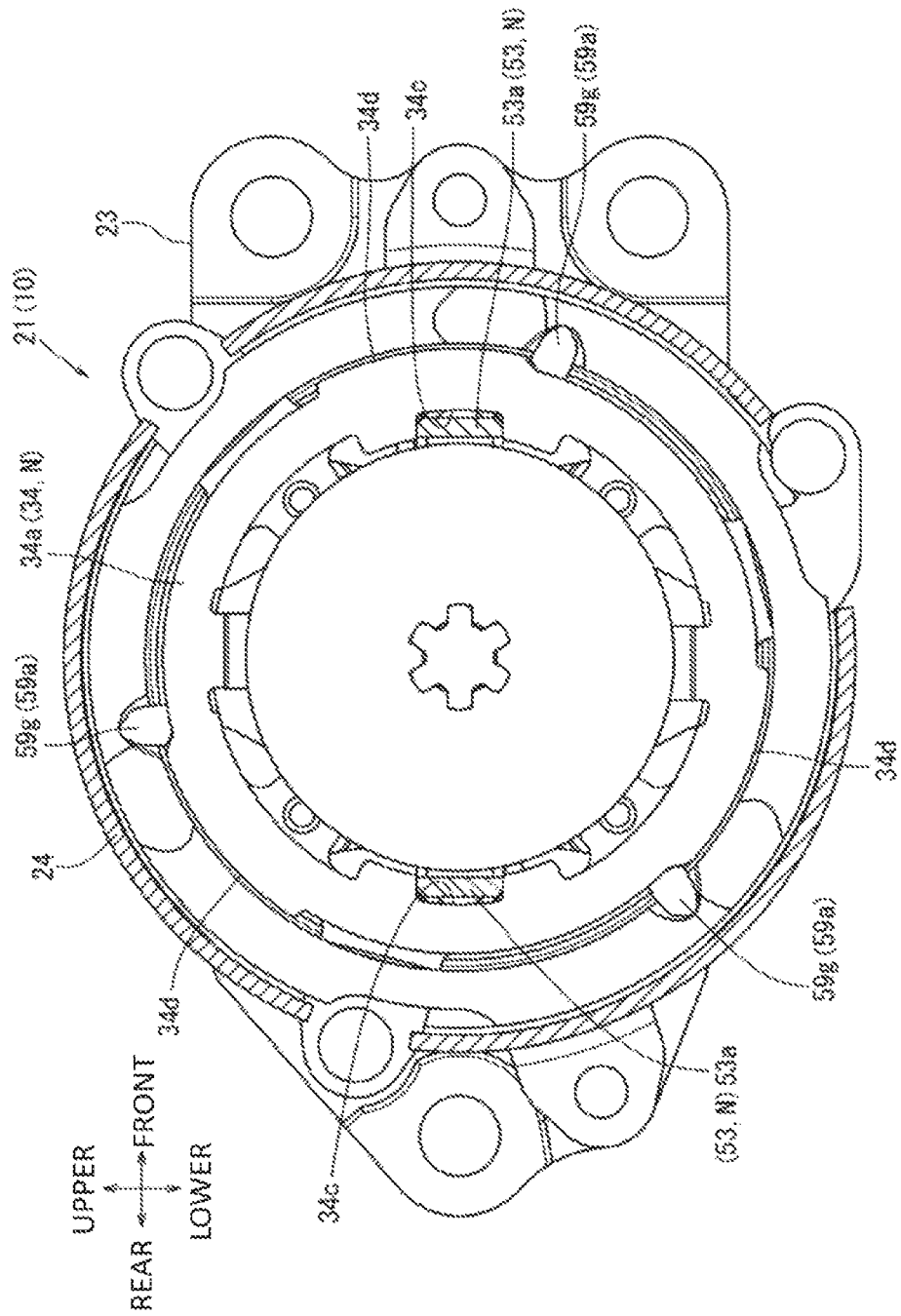
FIG. 22 is an explanatory diagram showing an assembled state of an operation plate and the clutch portion.
Figure 23:
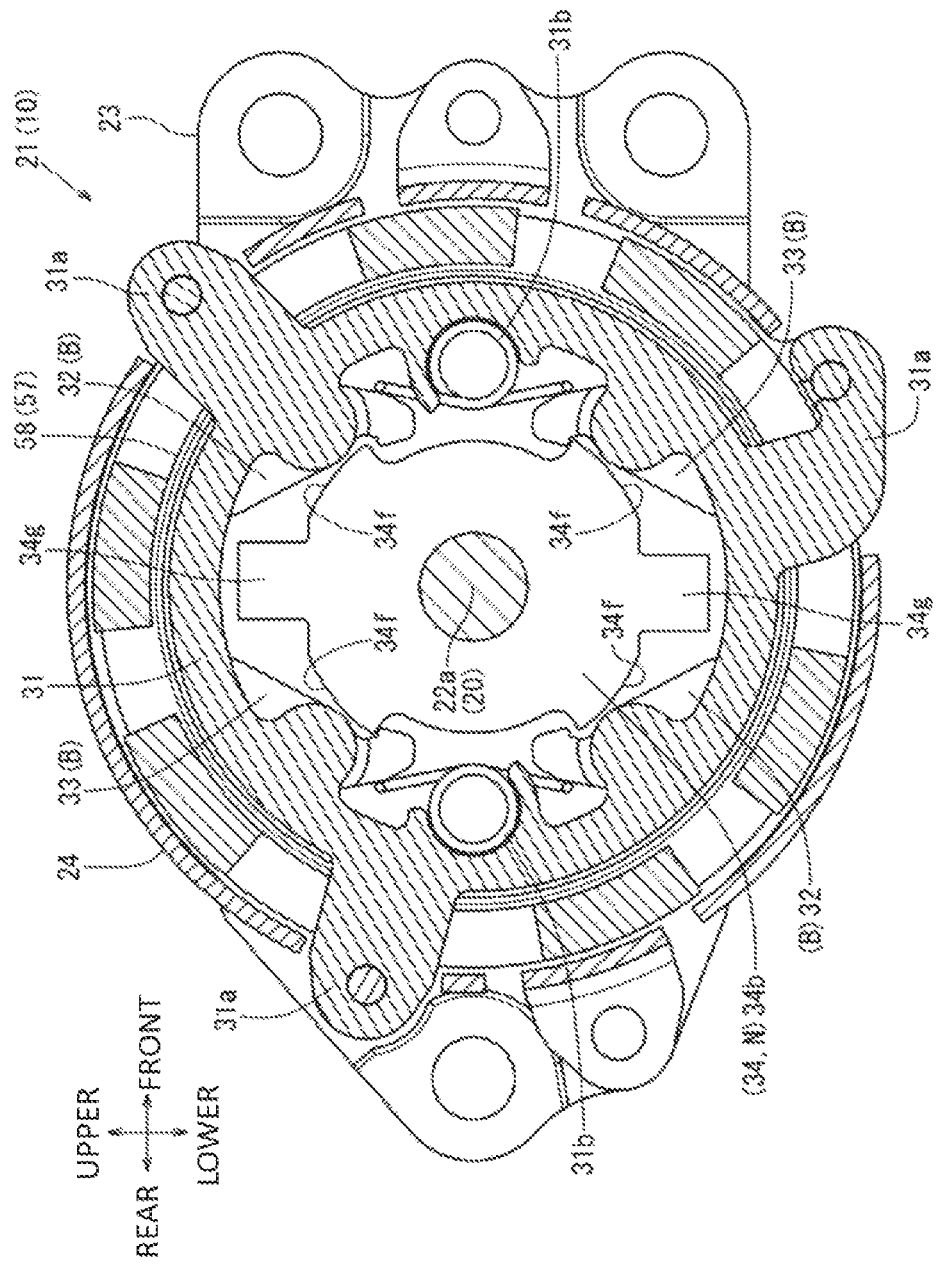
FIG. 23 is an explanatory diagram showing an assembled state of the pole holder.
Figure 24:
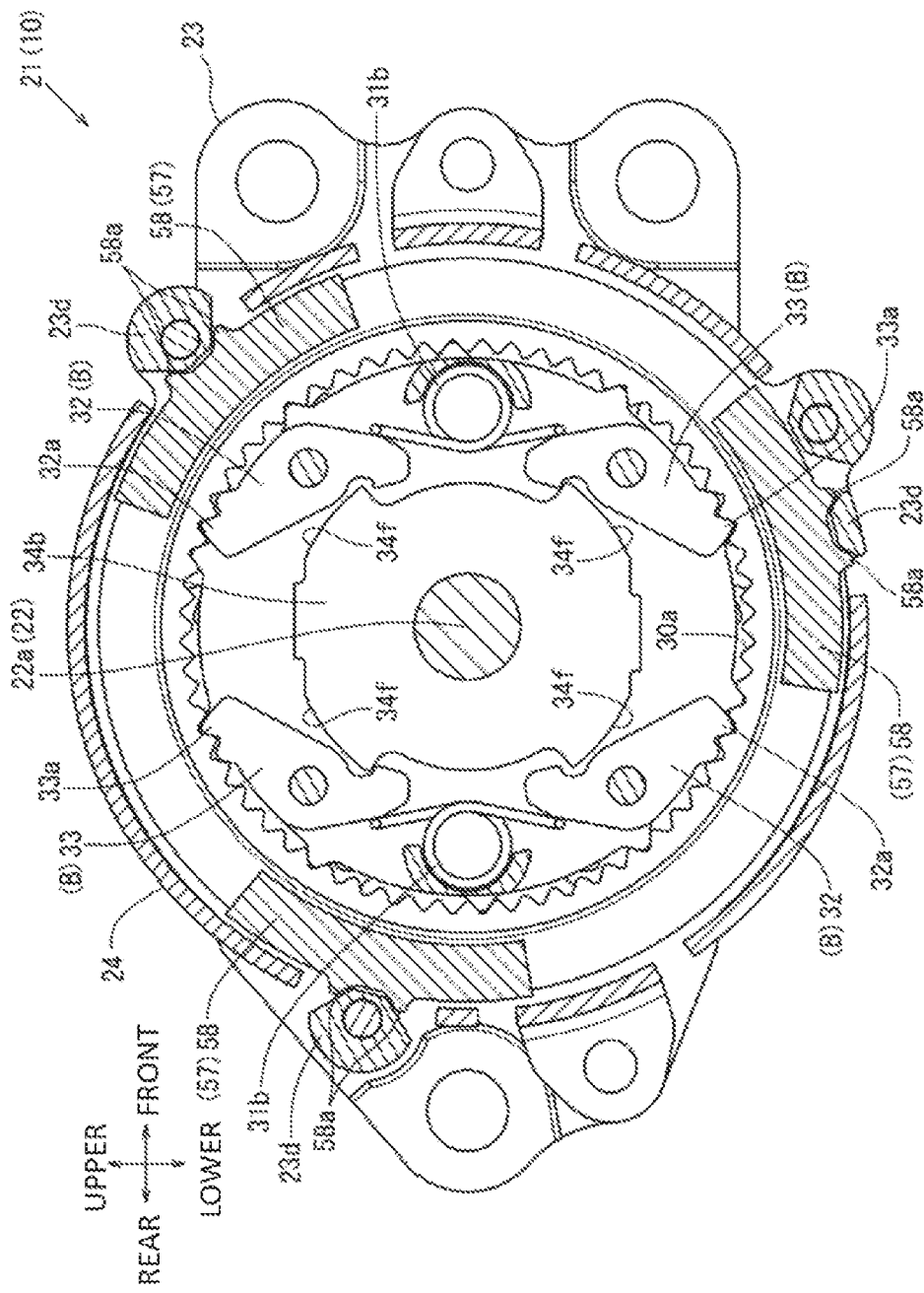
FIG. 24 is an explanatory diagram showing an assembled state of the operation plate, the lock plate, and a pole.
Figure 25:
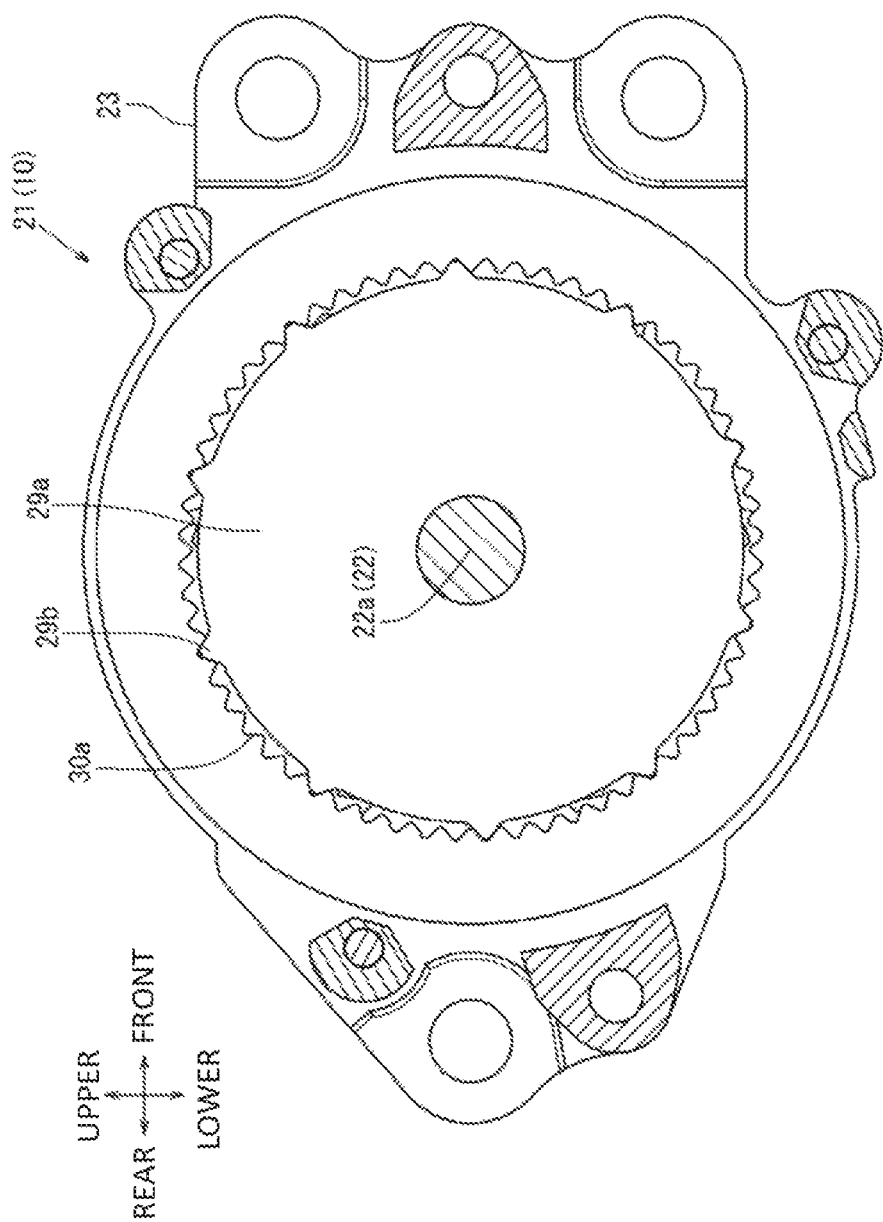
FIG. 25 is an explanatory diagram showing an assembled state of the lock plate and a sun gear plate.
Figure 26:
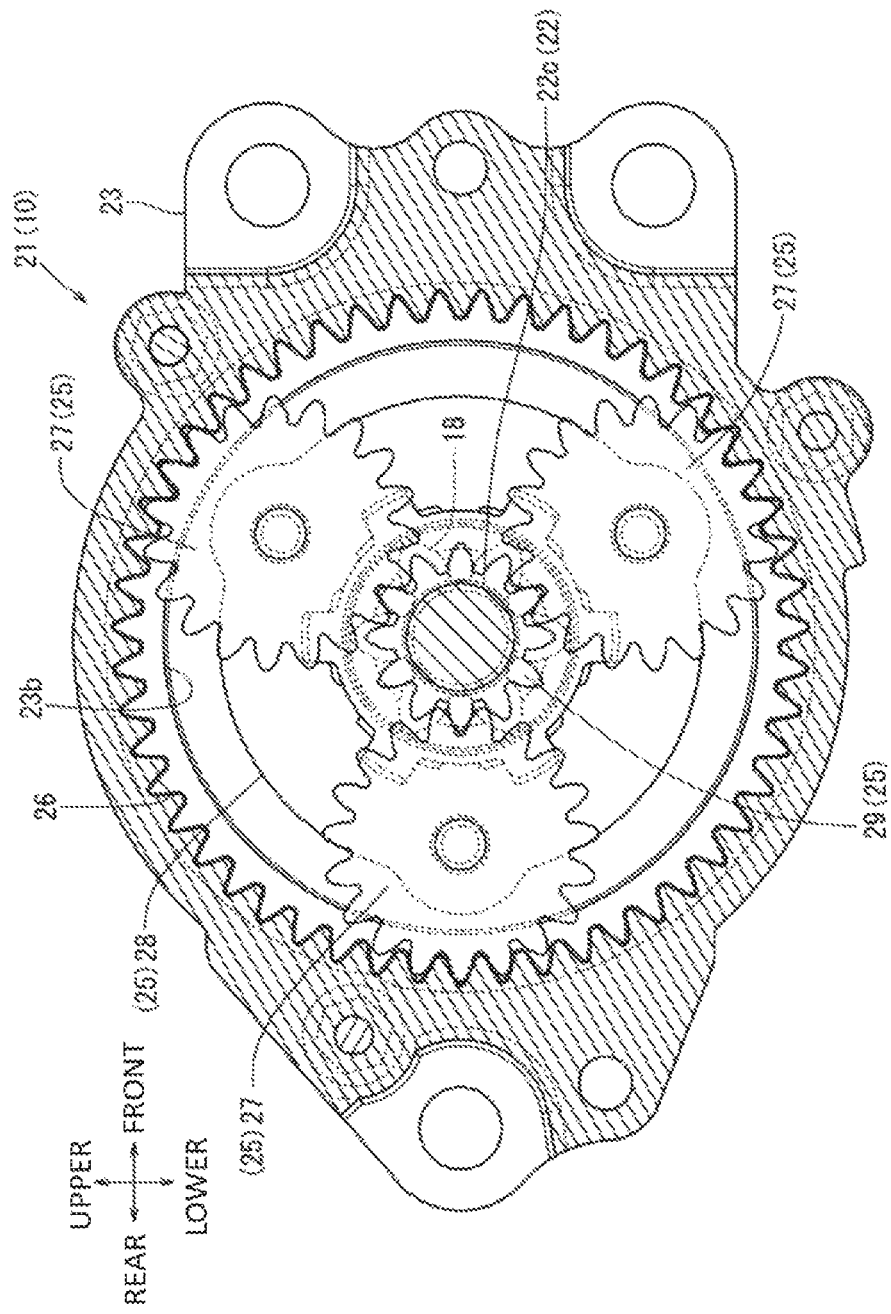
FIG. 26 is an explanatory diagram showing an assembled state of a planetary gear mechanism.
Figure 27:
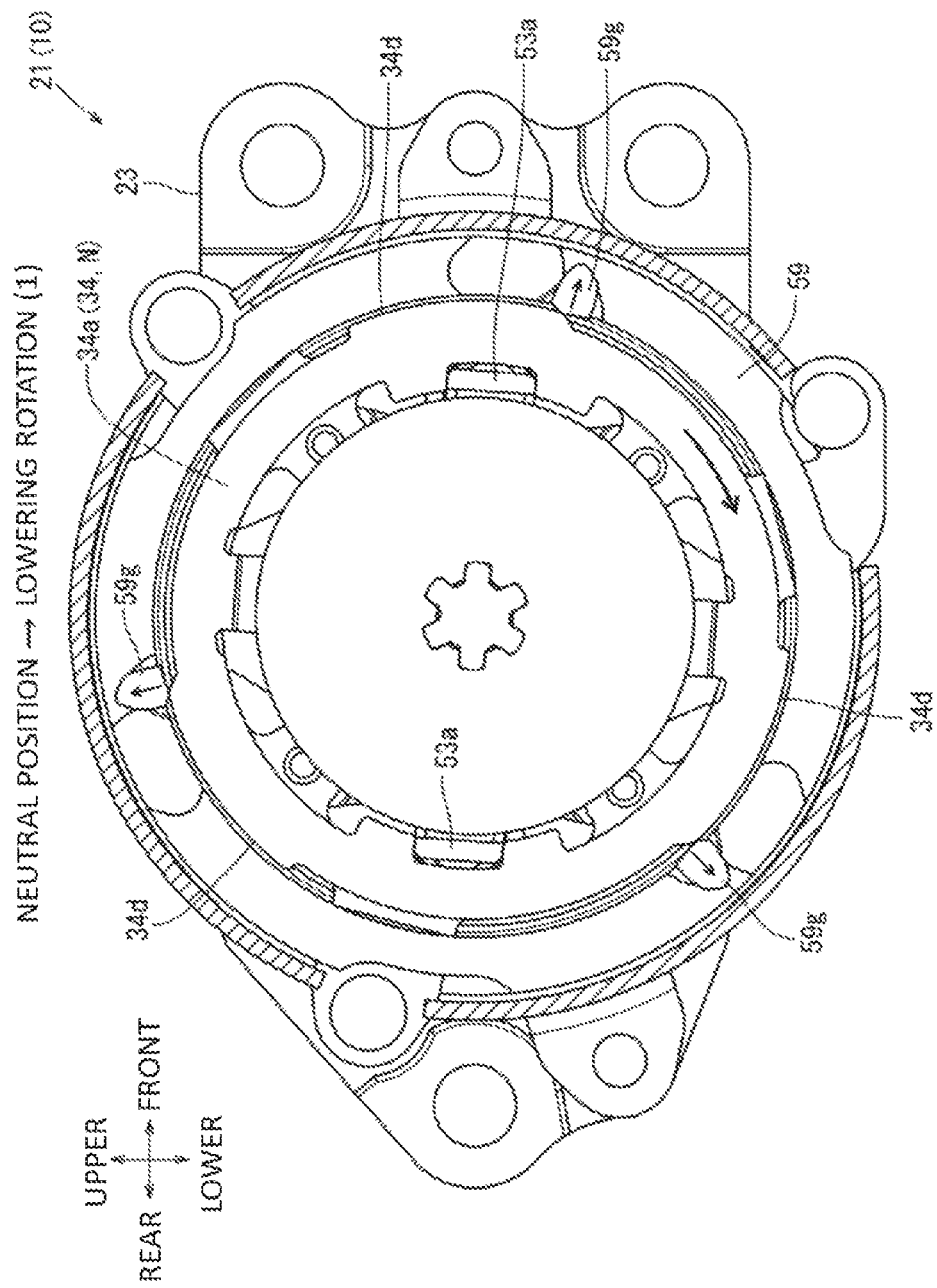
FIG. 27 is an operation state diagram of a friction generating portion when the operation handle is pressed down from a neutral position.

FIGS. 20 and 24 show a state where the operation handle 20 is not operated and is located at an operation release position while the outer lever 41 and the inner lever 53 are not rotated and are located at the neutral position. At this time, as shown in FIG. 20, the engagement end portion 52a which forms the external teeth of the feed claw 52 is meshed with the internal teeth 36b of the feed gear 36 due to urging of the torsion spring 53c. As shown in FIG. 24, the external teeth 32a, 33a of the poles 32, 33 are engaged with the internal teeth 30a of the lock plate 30 due to urging of the torsion springs 31b. Accordingly, rotation of the lock plate 30 is locked via engagement of the poles 32, 33, and the height of the seat 1 is not changed on the lifting side or the lowering side.

Operation of Rotation Control Device 21 (Push Down Operation Handle 20)

FIGS. 27 to 30 show a state where the operation handle 20 is pushed down from the neutral position. At this time, the inner lever 53 is rotated due to rotation of the outer lever 41. As a result, the operation plate 34 is rotated by the engagement piece 53a of the inner lever 53 as indicated by the arrow in FIG. 27. When an angle of the rotation is, for example, 3 degrees or more, the protruding portion 59g of the clutch portion 59a of the pressing plate 59 is pushed to the outer peripheral side by the first operation portion 34d of the outer periphery ring 34a of the operation plate 34, and the pressing plate 59 is pressed toward the friction spring 58. Accordingly, friction is applied to the lock plate 30 by the friction generating portion 57 (see FIGS. 11 and 12).

Figure 28:
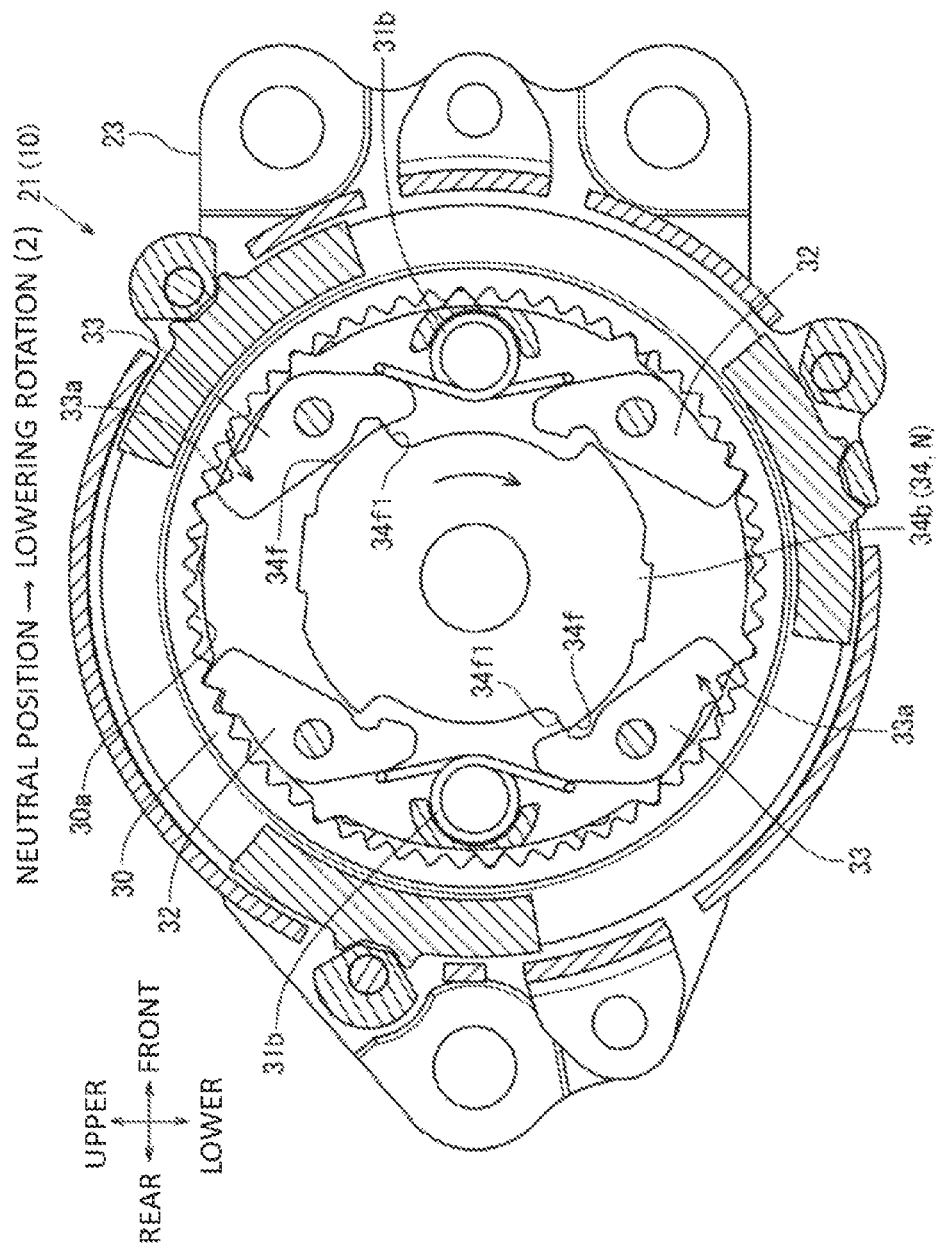
FIG. 28 is an operation state diagram of a lock mechanism when the operation handle is pressed down from the neutral position.

When the outer lever 41 and the inner lever 53 are further rotated and an angle of the rotation is, for example, 5 degrees or more (corresponding to the second operation angle of the present disclosure), as shown in FIG. 28, the engagement end portion 34f1 of the second operation portion 34f swings the pair of poles 33 due to rotation of the inner periphery ring 34b of the operation plate 34, and the external teeth 33a are separated from the internal teeth 30a of the lock plate 30. Therefore, the lock plate 30 is unlocked, and the lock plate 30 is rotatable in the direction in which the seat 1 is lowered.

Figure 29:
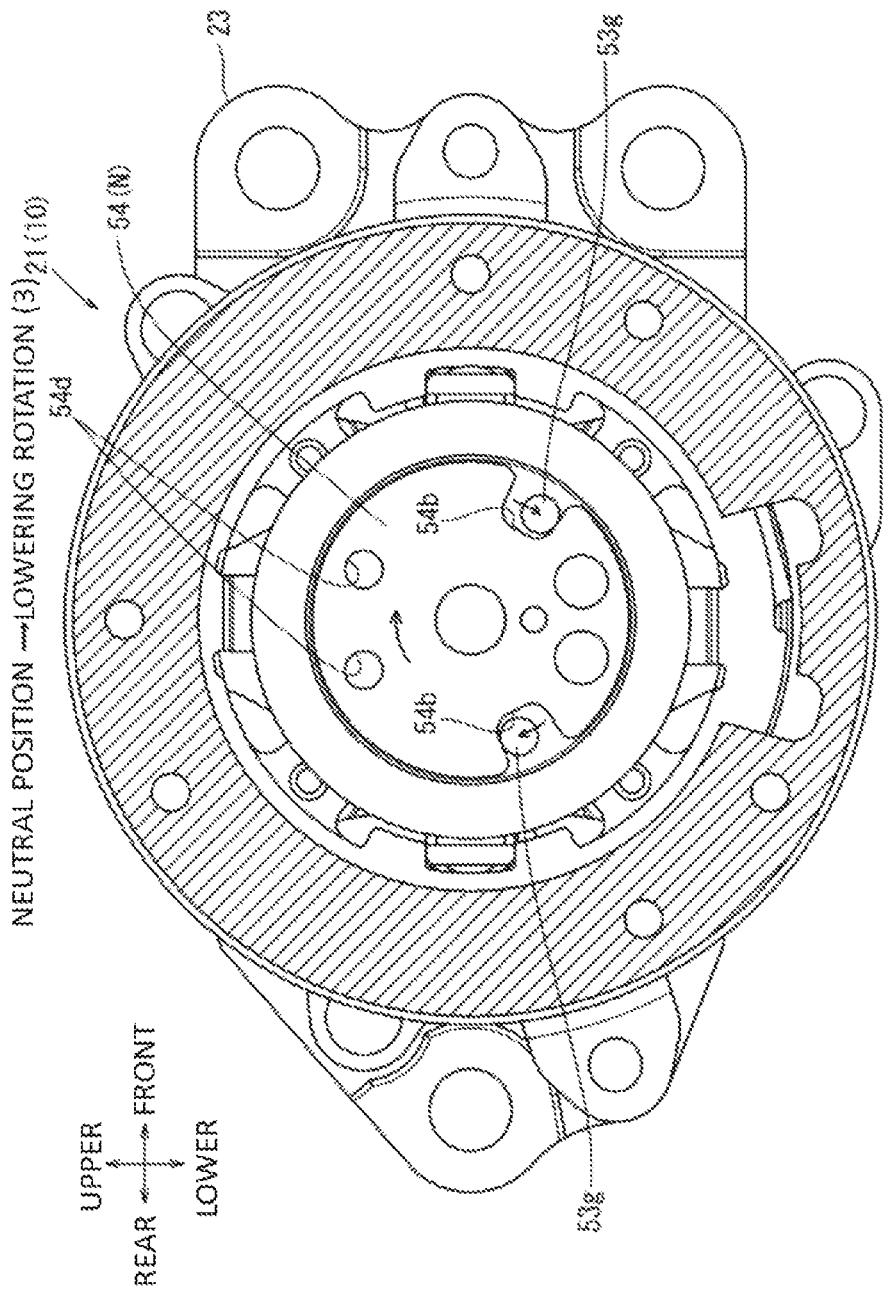
FIG. 29 is an operation state diagram of the operation portion of the feed mechanism when the operation handle is pressed down from the neutral position.
Figure 30:
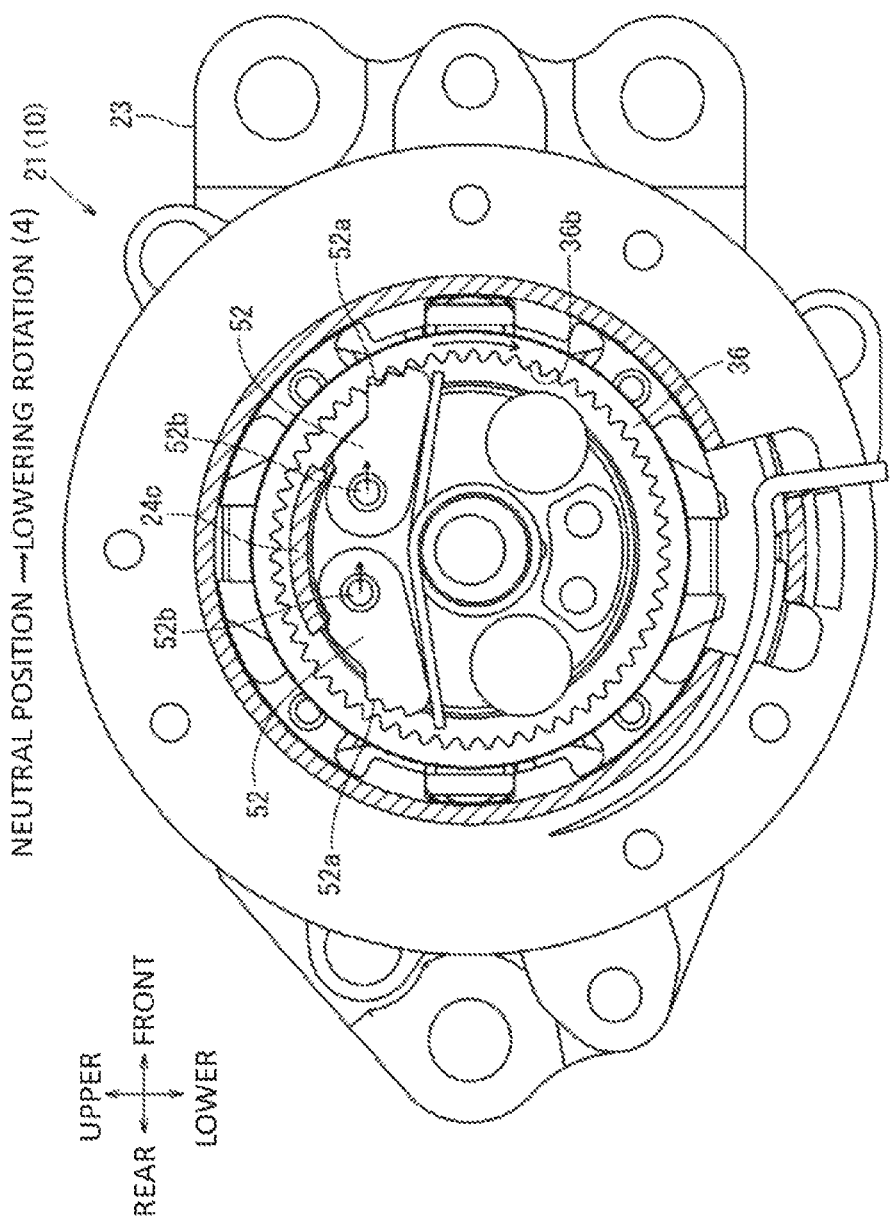
FIG. 30 is an operation state diagram of the feed claw of the feed mechanism when the operation handle is pressed down from the neutral position.

When the outer lever 41 and the inner lever 53 are further rotated and the angle of the rotation is, for example, 5.5 degrees or more (corresponding to the first operation angle of the present disclosure), as shown in FIG. 29, the protrusion 53g of the coupling pin 53b of the inner lever 53 moves as indicated by the arrow, abuts against a wall surface inside the notch 54b of the operation portion 54, and rotates the operation portion 54 as indicated by the arrow. Therefore, the hinge portions 52b of the feed claws 52 are moved by the through holes 54d of the operation portion 54 as indicated by the arrow in FIG. 30, and the engagement end portion 52a of one of the feed claw 52 engages with the internal teeth 36b so as to rotate the feed gear 36 as indicated by the arrow. Since the feed gear 36 directly rotates the rotation shaft 22, the seat 1 is lowered. At this time, the other feed claw 52 rides on the cut-and-raised piece 24c of the cover 24, and the engagement end portion 52a is separated from the internal teeth 36b of the feed gear 36.

As is apparent from FIG. 18, when the outer lever 41 and the inner lever 53 are rotated to a certain angle, the coupling pin 53b of the inner lever 53 is engaged with an end edge portion of the through hole 24a and is restricted from being further operated. Therefore, in a case where an amount of lowering of the seat 1 cannot be satisfied by one single operation of the operation handle 20, the seat 1 can be lowered to a desired position by performing a pumping operation of repeatedly pushing down the operation handle 20.

As described above, when the operation handle 20 is operated in the direction in which the seat 1 is lowered while the outer lever 41 and the inner lever 53 are rotated, the friction generating unit 57 functions at first, then the lock is released by the lock mechanism B, and finally the rotation shaft 22 is rotated by the rotation drive mechanism A to lower the seat 1. Therefore, the seat 1 is lowered while an influence of the gravity of the seat 1 is restrained by the friction generating portion 57.

Operation of Rotation Control Device 21 (When Pushing Down of Operation Handle 20 is Finished)

When the pushing down of the operation handle 20 is finished, rotation of the outer lever 41 and the inner lever 53 is returned toward the neutral position by an urging force of the torsion spring 43. Therefore, the rotation is stopped by the rotation drive mechanism A, the lock mechanism B is locked, and the friction generating unit 57 does not function, which is contrary to the rotation from the neutral position as described above. At this time, the lock mechanism B is not locked until the pole 33 is completely meshed with the internal teeth 30a of the lock plate 30, and the lock plate 30 continues to rotate upon receiving a load of the seat 1. Although the rotation of the lock plate 30 is transmitted from the rotation shaft 22 via the speed increasing mechanism 25, the rotation of the rotation shaft 22 is reduced with respect to the rotation of the lock plate 30 due to an action of the speed increasing mechanism 25. Therefore, when the pushing down of the operation handle 20 is finished, the amount of lowering of the seat 1 is reduced as compared with a case where the speed increasing mechanism 25 is not provided. Moreover, since a load, which is applied to tooth surfaces when the external teeth 33a of the pole 33 mesh with the internal teeth 30a of the lock plate 30, is smaller as compared with the case where the speed increasing mechanism 25 is not provided, shock and noise associated with the meshing can be reduced.

Operation of Rotation Control Device 21 (Pull Up Operation Handle 20)

When the operation handle 20 is pulled up from the neutral position, the outer lever 41 and the inner lever 53 are rotated in an opposite direction with respect to the above-described pushing-down operation. As a result, the operation plate 34 is rotated by the engagement piece 53a in a direction opposite to the arrow in FIG. 27. Therefore, the protruding portion 59g of the clutch portion 59a of the pressing plate 59 is not pushed to the outer peripheral side by the first operation portion 34d of the outer periphery ring 34a of the operation plate 34, and the pressing plate 59 is not pressed toward the friction spring 58. Accordingly, friction is not applied to the lock plate 30 by the friction generating portion 57.

Figure 31:
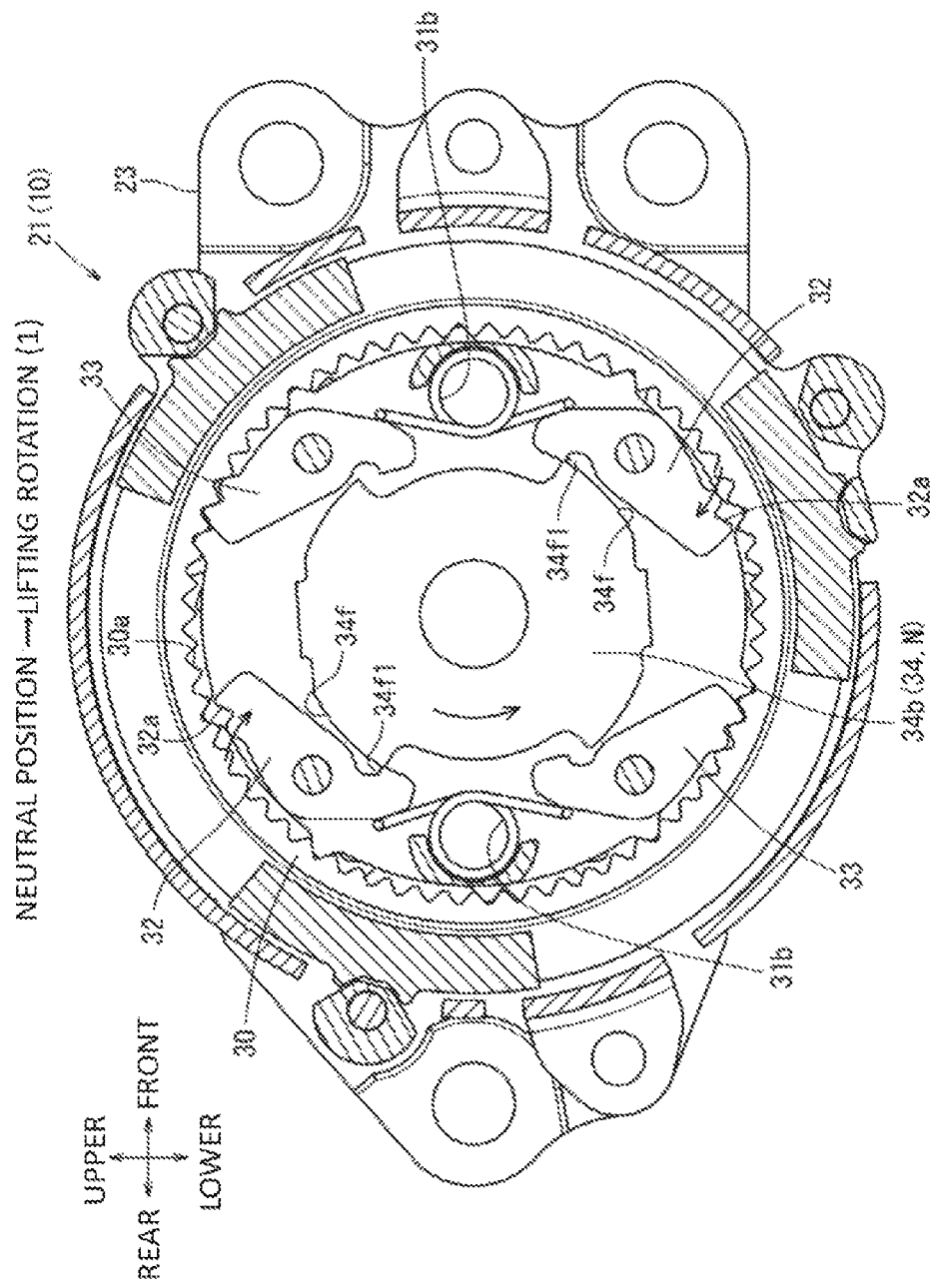
FIG. 31 is an operation state diagram of the lock mechanism when the operation handle is pulled up from the neutral position.

When an angle of the rotation of the outer lever 41 and the inner lever 53 is, for example, 2.5 degrees or more (corresponding to the second operation angle of the present disclosure), as shown in FIG. 31, the engagement end portion 34f1 of the second operation portion 34f swings the pair of poles 32 due to rotation of the inner periphery ring 34b of the operation plate 34, and the external teeth 32a are separated from the internal teeth 30a of the lock plate 30. Therefore, the lock plate 30 is unlocked, and the lock plate 30 is rotatable in the direction in which the seat 1 is lifted.

Figure 32:
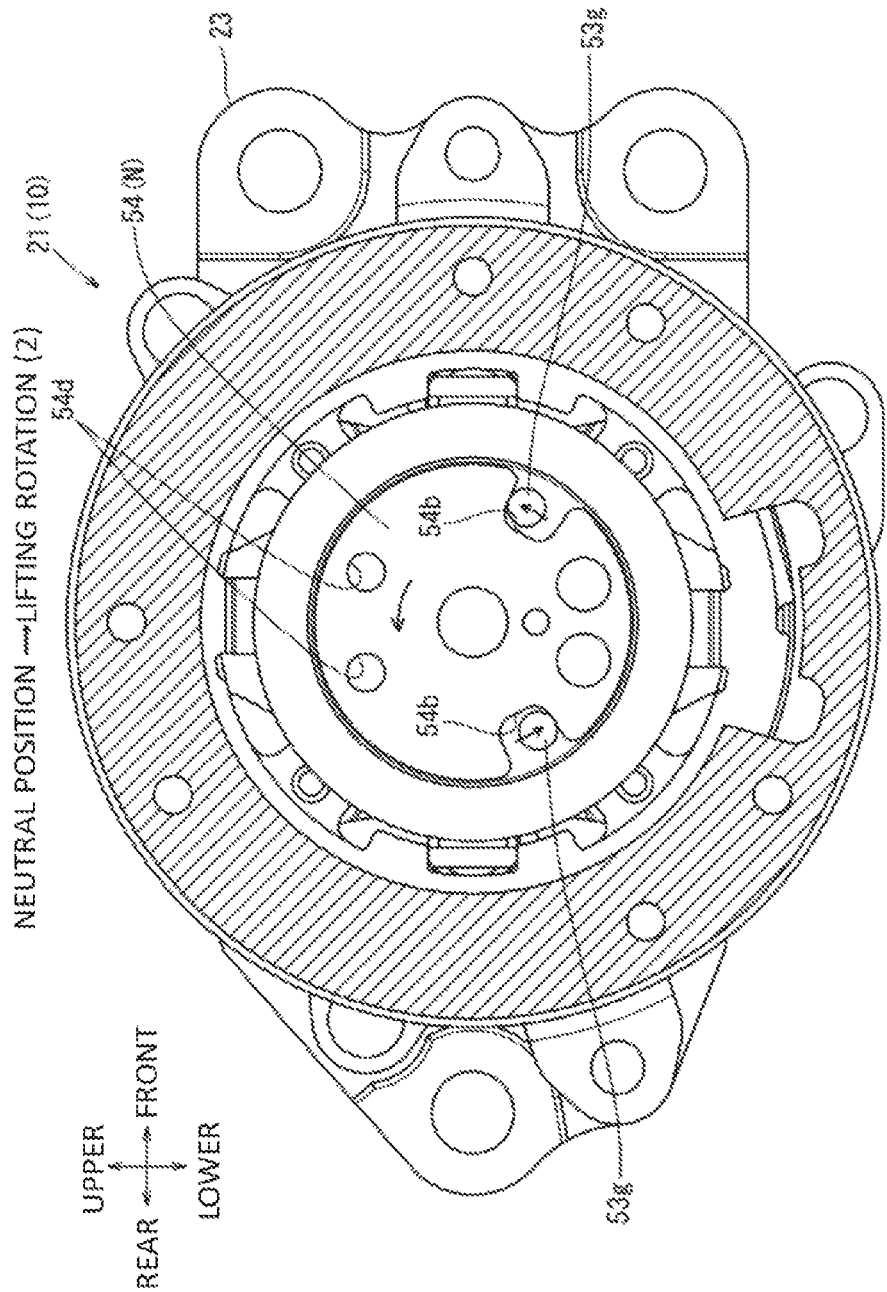
FIG. 32 is an operation state diagram of the operation portion of the feed mechanism when the operation handle is pulled up from the neutral position.
Figure 33:
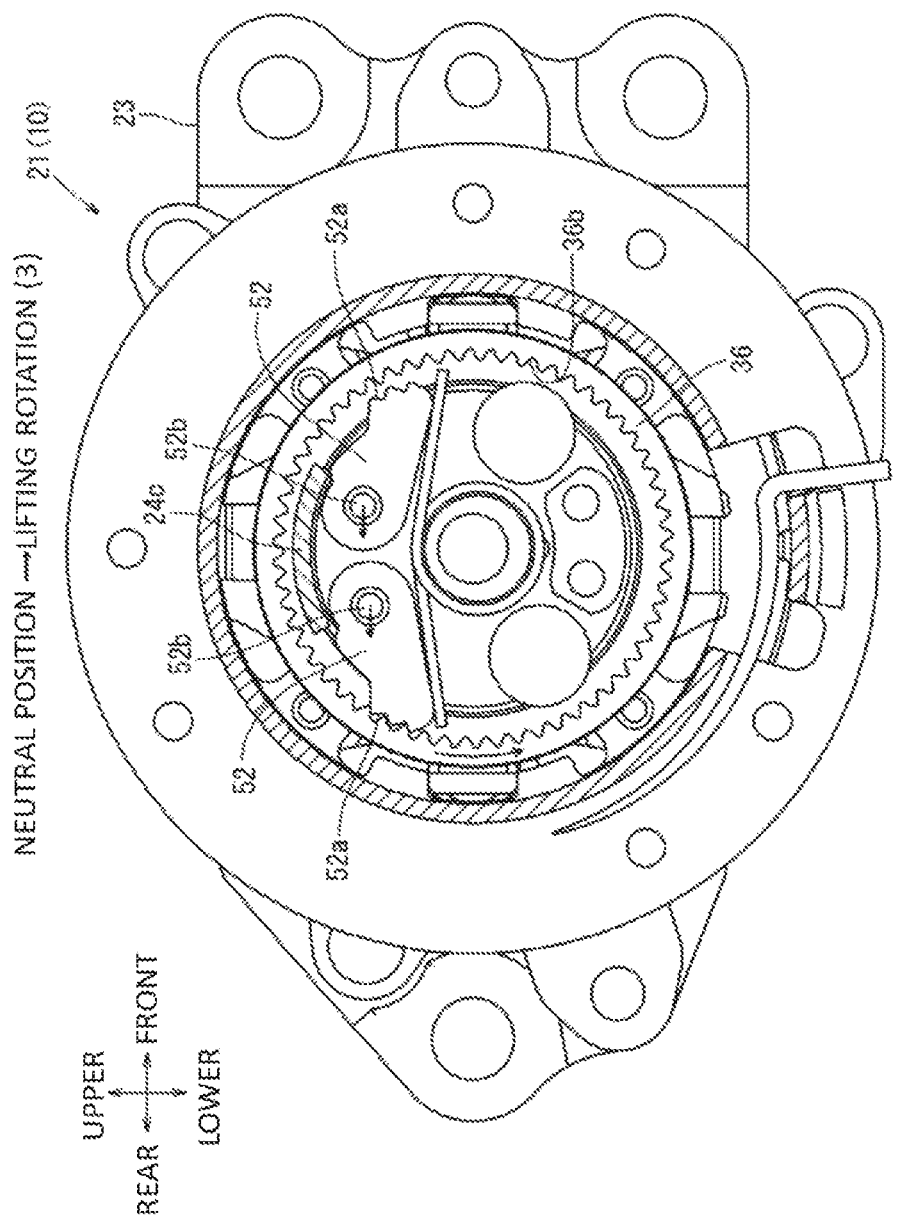
FIG. 33 is an operation state diagram of the feed claw of the feed mechanism when the operation handle is pulled up from the neutral position.

When the outer lever 41 and the inner lever 53 are further rotated and the angle of the rotation is, for example, 3 degrees or more (corresponding to the first operation angle of the present disclosure), as shown in FIG. 32, the protrusion 53g of the coupling pin 53b of the inner lever 53 troves as indicated by the arrow, abuts against the wall surface inside the notch 54b of the operation portion 54, and rotates the operation portion 54 as indicated by the arrow. Therefore, the hinge portions 52b of the feed claws 52 are moved by the through holes 54d of the operation portion 54 as indicated by the arrow in FIG. 33, and the engagement end portion 52a of the other feed claw 52 engages with the internal teeth 36b so as to rotate the feed gear 36 as indicated by the arrow. Since the feed gear 36 directly rotates the rotation shaft 22, the seat 1 is lifted. At this time, the one feed claw 52 rides on the cut-and-raised piece 24c of the cover 24, and the engagement end portion 52a is separated from the internal teeth 36b of the feed gear 36.

As is apparent from FIG. 18, when the outer lever 41 and the inner lever 53 are rotated to a certain angle, the coupling pin 53b of the inner lever 53 is engaged with an end portion of the through hole 24a and is restricted from being further operated. Therefore, in a case where an amount of lifting of the seat 1 cannot be satisfied by one single operation of the operation handle 20, the seat 1 can be lifted to a desired position by performing a pumping operation of repeatedly pulling up the operation handle 20.

As described above, when the operation handle 20 is operated in the direction in which the seat 1 is lifted while the outer lever 41 and the inner lever 53 are rotated, the friction generating unit 57 does not function, the lock is released by the lock mechanism B, and then the rotation shaft 22 is rotated by the rotation drive mechanism A to lift the seat 1. Therefore, the seat 1 is lifted without being affected by the friction of the friction generating portion 57.

Operation of Rotation Control Device 21 (When Pulling Up of Operation Handle 20 is Finished)

When the pulling up of the operation handle 20 is finished, the rotation of the outer lever 41 and the inner lever 53 is returned toward the neutral position by the urging force of the torsion spring 43. Therefore, the rotation is stopped by the rotation drive mechanism A, and the lock mechanism B is locked, which is contrary to the rotation from the neutral position as described above. At this time, the lock mechanism B is not locked until the pole 33 is completely meshed with the internal teeth 30a of the lock plate 30, and the lock plate 30 continues to rotate upon receiving the load of the seat 1. Although the rotation of the lock plate 30 is transmitted from the rotation shaft 22 via the speed increasing mechanism 25, the rotation of the rotation shaft 22 is reduced with respect to the rotation of the lock plate 30 due to the action of the speed increasing mechanism 25. Therefore, when the pulling up of the operation handle 20 is finished, the amount of lowering of the seat 1 is reduced as compared with the case where the speed increasing mechanism 25 is not provided. Moreover, since the load, which is applied to tooth surfaces when the external teeth 33a of the pole 33 mesh with the internal teeth 30a of the lock plate 30, is smaller as compared with the case where the speed increasing mechanism 25 is not provided, the shock and noise associated with the meshing can be reduced.

Operation of Rotation Control Device 21 (Conclusion)

As described above, when the operation handle 20 is pushed down, the seat 1 is lowered by a movement amount corresponding to the operation. By repeating the push-down operation, the seat 1 can be adjusted to a desired height. Conversely, when the operation handle 20 is pulled up, the seat 1 is similarly lifted by a movement amount corresponding to the operation. By repeating the pull-up operation, the seat 1 can be adjusted to a desired height.

Function and Effect of First Embodiment

According to the first embodiment, rotation of the rotation shaft 22 driven by the rotation drive mechanism A is performed independently of the speed increasing mechanism 25. Therefore, an operation of the operation handle 20 for operating the rotation drive mechanism A is not changed as compared with a case where the speed increasing mechanism 25 is not provided. Even though the speed increasing mechanism 25 is provided, the operation of the operation handle 20 does not become heavy and an operation amount thereof does not increase.

The rotation driving mechanism A directly transmits the rotation of the rotation drive mechanism A to the rotation shaft 22 through a through hole 29c of the sun gear 29 of the speed increasing mechanism 25. Therefore, load transmission paths of the rotation drive mechanism A and the speed increasing mechanism 25 can be in a parallel relationship with each other.

Further, the friction generating portion 57 is provided with respect to the lock plate 30 speeded up by the speed increasing mechanism 25. Therefore, a frictional force of the friction generating portion 57 for restraining the rotation of the rotation shaft 22 can be reduced. Accordingly, a configuration of the friction generating portion 57 can be simplified.

The first teeth speeded up by the speed increasing mechanism 25 is the internal teeth 30a of the lock plate 30 having a simple shape. The external teeth 32a, 33a, which are the second teeth formed on the swinging poles 32, 33, serve as fixed sides. Therefore, a centrifugal force accompanying the speed increase can be prevented from acting as an excessive external force on the poles 32, 33.

The leg portion 31a of the pole holder 31 is arranged in a space formed by the wave-shaped surface of the friction spring 58. Therefore, space efficiency is improved, and the rotation control device 21 can be downsized.

When the operation handle 20 is operated, the first operation portion 34d of the operation plate 34 is operated by the engagement piece 53a (first input portion) of the inner lever 53, and the friction generating portion 57 is in a functioning state. Thereafter, the second operation portion 34f is operated, and the lock state of the lock mechanism B is unlocked. Finally, the feed claws 52 and the feed gear 36 are operated by the operation portion 54 (second input portion), and the rotation shaft 22 is rotationally driven. Accordingly, by operating the operation handle 20, a series of operations of unlocking the lock mechanism B and rotationally driving the rotation shaft 22 to lift or lower the seat can be performed in a state where the friction generating portion 57 functions.

Second Embodiment

Figure 5:
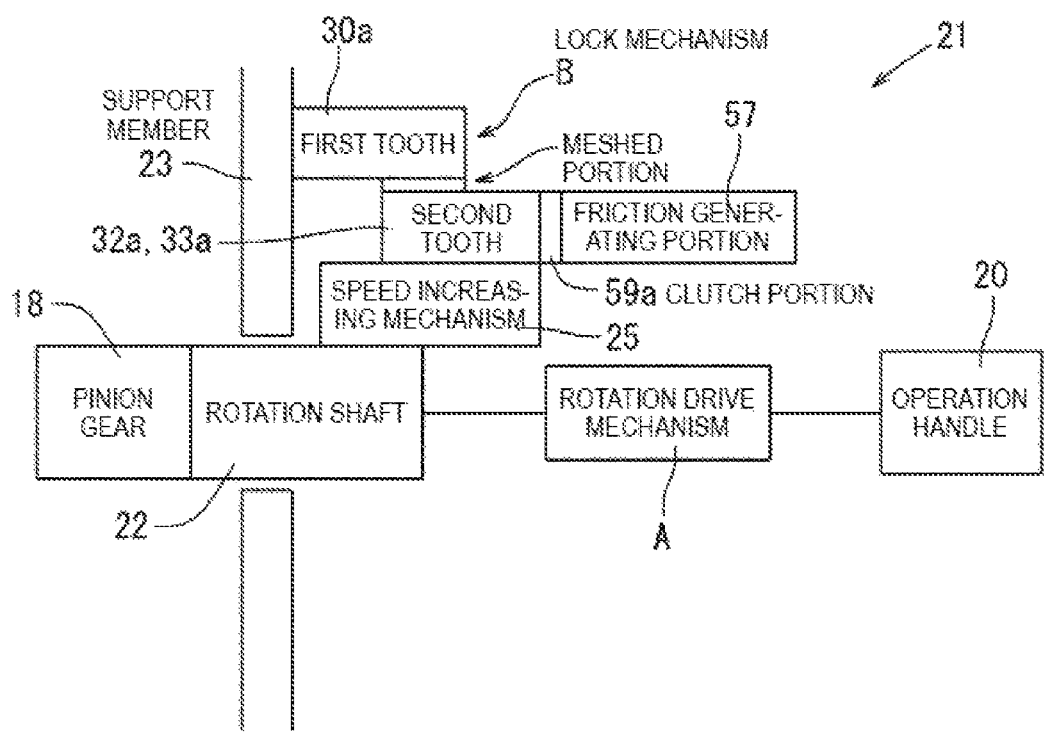
FIG. 5 is a functional block diagram corresponding to FIG. 4 showing a rotation control device according to a second embodiment of the present disclosure.

FIG. 5 shows a second embodiment of the present disclosure. A feature of the second embodiment as compared with the first embodiment (see FIG. 4), in which the first teeth 30a is rotated by the speed increasing mechanism 25 while the second teeth 32a, 33a are provided on the support member 23, is that the second teeth 32a, 33a are rotated by the speed increasing mechanism 25 while the first teeth 30a are provided on the support member 23 in the second embodiment. Other configurations are the same, and the same parts will not be described again.

Specifically, in a configuration of the second embodiment, the lock plate 30 in the specific example of the first embodiment described above is fixed to the support member 23, and the pole holder 31 is rotated by the sun gear 29. The friction generating portion 57 is provided with respect to the pole holder 31. As a result, the pole holder 31 is rotated by the sun gear 29, and the poles 32, 33 held by the pole holder 31 are meshed with the lock plate 30 fixed to the support member 23. Therefore, the second embodiment can also function basically in the same manner as the first embodiment.

Third Embodiment

Figure 34:
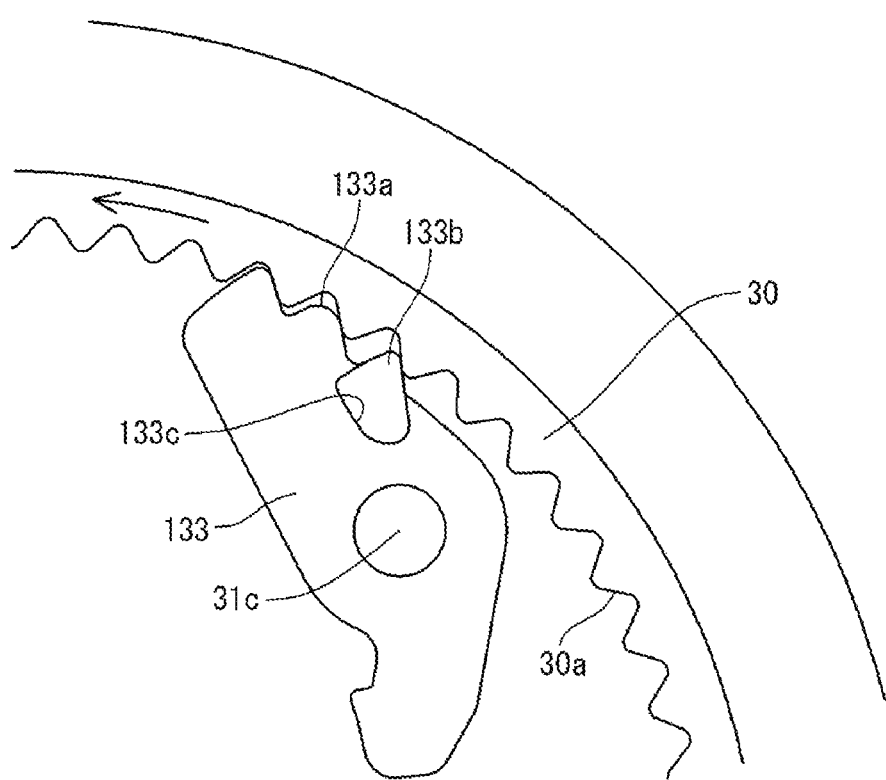
FIG. 34 is an enlarged front view showing one pole of a lifter device according to a third embodiment of the present disclosure.

FIG. 34 shows a third embodiment of the present disclosure. A feature of the third embodiment as compared with the first embodiment (see FIGS. 6 to 26) is that an elastic body serving as a cushioning material is added to the pole of the lock mechanism B. Other configurations of the third embodiment are the same as those of the first embodiment, and repeated descriptions of the same parts will be omitted.

In FIG. 34, one pole 133 among four poles is shown. Although descriptions have been omitted here, the same also applies to the other three poles. An elastic body 133b having the same shape as external teeth 133a is provided closer to a hinge center (protrusion 31c) than the external teeth 133a of the pole 133. The elastic body 133b is made of rubber, resin, or the like, and is fitted and fixed to a notch 133c of the metal pole 133.

As for the pole 133, when the lock plate 30 rotates in a direction indicated by the arrow while the pole 133 slides on the tooth surface of the internal teeth 30a in a state where the external teeth 133a are not separated from the internal teeth 30a of the lock plate 30, the internal teeth 30a and the external teeth 133a of the pole 133 form a ratchet mechanism, so that tooth tips thereof collide with each other. This is because the pole 133 is urged by a torsion spring (not shown) in a direction in which the external teeth 133a mesh with the internal teeth 30a. Therefore, collision noise is generated due to collision between the tooth tips of the internal teeth 30a and the external teeth 133a. In the third embodiment, when the external teeth 133a of the pole 133 slide on the tooth surface of the internal teeth 30a, the elastic body 133b is provided to the pole 133 such that the elastic body 133b comes into contact with the internal teeth 30a earlier than the external teeth 133a coming into contact with the internal teeth 30a at first. Therefore, when the external teeth 133a of the pole 133 slide on the tooth surface of the internal teeth 30a, the elastic body 133b collides with the internal teeth 30a to prevent the external teeth 133a from colliding with the internal teeth 30a. Therefore, generation of the collision noise can be restrained.

Fourth Embodiment

Figure 35:
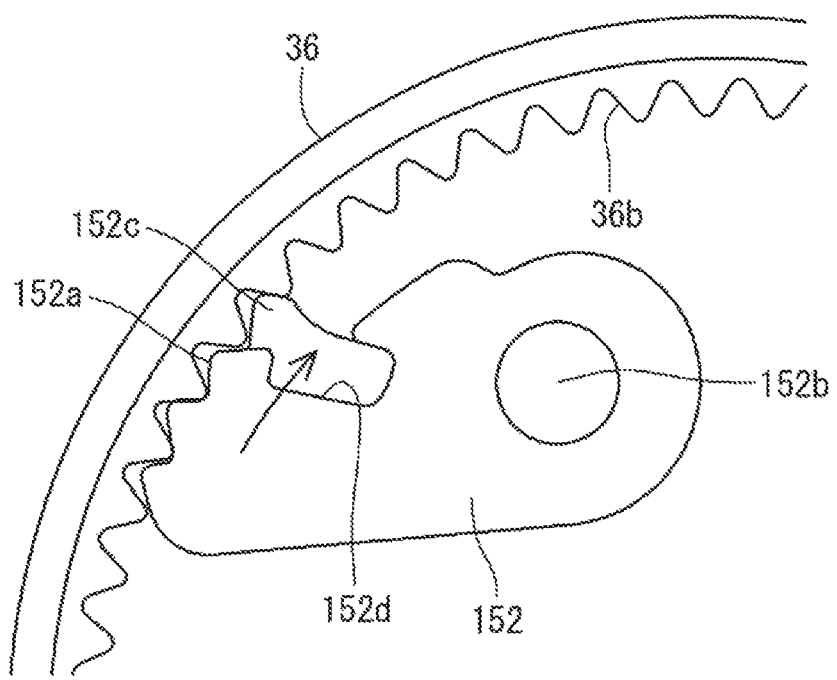
FIG. 35 is an enlarged front view showing one feed claw of a lifter device according to a fourth embodiment of the present disclosure.

FIG. 35 shows a fourth embodiment of the present disclosure. A feature of the fourth embodiment as compared with the first embodiment (see FIGS. 6 to 26) is that an elastic body 152c serving as a cushioning material is added to feed claws 152. Other configurations of the fourth embodiment are the same as those of the first embodiment, and repeated descriptions of the same parts will be omitted.

In FIG. 35, one feed claw 152 among a pair of the feed claws 152 is shown. Although descriptions have been omitted here, the same also applies to the other feed claw 152. The elastic body 152c having the same shape as an engagement end portion 152a is provided closer to a hinge center (hinge portion 152b) than the engagement end portion 152a of the one feed claw 152. The elastic body 152c is made of rubber, resin, or the like, and is fitted and fixed to a notch 152d of the metal feed claw 152.

When the operation handle 20 is operated in any direction, the engagement end portion 152a of any one feed claw 152 among the pair of feed claws 52 engages with the internal teeth 36b of the feed gear 36 to perform a feeding operation of the feed gear 36. Thereafter, when the operation of the operation handle 20 is stopped, the feeding operation of the feed gear 36 performed by the engagement end portion 152a of the one feed claw 152 is stopped, and rotation of the feed gear 36 is stopped. At this time, the operation handle 20 is returned to the neutral position, and accordingly, the one feed claw 152 is moved together with the operation handle 20 in a direction opposite to that of the feeding operation (direction of the arrow in FIG. 35). As a result, the one feed claw 152 slides on the tooth surface of the internal teeth 36b. This is because the one feed claw 152 and the internal teeth 36b constitute a ratchet mechanism. When the one feed claw 152 slides on the tooth surface of the internal teeth 36b in this way, the engagement end portion 152a of the one feed claw 152 is constantly urged by a torsion spring (not shown) in a direction to engage with the internal teeth 36b, so that tooth tips of the engagement end portion 152a and the internal teeth 36b collide with each other and generate collision noise. In the fourth embodiment, when the engagement end portion 152a of the one feed claw 152 slides on the tooth surface of the internal teeth 36b, the elastic body 152c is provided to the feed claw 152 such that the elastic body 152c comes into contact with the internal teeth 36b earlier than the engagement end portion 152a coming into contact with the internal teeth 36b at first. Therefore, when the engagement end portion 152a of the one feed claw 152 slides on the tooth surface of the internal teeth 36b, the elastic body 152c collides with the internal teeth 36b to prevent the engagement end portion 152a from colliding with the internal teeth 36b. Therefore, the collision noise can be reduced.

The disclosure provides illustrative, non-limiting examples as follows:

An object of the present disclosure is to provide a lifter device which can adjust a height of a seat in accordance with an operation of an operation handle, and locks a change in the height of the seat by meshing teeth which rotate relative to each other in accordance with the change in the height of the seat when the operation handle is not operated. By increasing an amount of relative rotation of the relatively rotating teeth with respect to the change in the seat height, the change in the height of the seat is restrained when the teeth is rotated relatively to mesh with each other due to the lock when the operation handle is not operated.

A lifter device according to a first aspect of the present disclosure includes: a pinion gear configured to mesh with an input gear of a link mechanism for lifting and lowering a seat; a rotation control device configured to control rotation of the pinion gear, the rotation control device including: a rotation shaft configured to rotate in synchronization with the pinion gear; a support member supporting the rotation shaft such that the rotation shaft is rotatable; a rotation drive mechanism configured to rotate the rotation shaft in a lifting direction or a lowering direction of the seat in accordance with an operation direction of an operation handle when the operation handle is operated to lift or lower the seat, the operation handle being configured to lift and lower the seat; and a lock mechanism configured to allow rotation of the rotation shaft when the operation handle is operated to lift or lower the seat, and configured to lock the rotation of the rotation shaft when the operation handle is in an operation-released state, the lock mechanism including: a first tooth provided on one of the rotation shaft and the support member; and a second tooth provided on the other one of the rotation shaft and the support member, the second tooth being configured to selectively mesh with the first tooth to lock relative rotation of the rotation shaft and the support member; and a speed increasing mechanism provided closer to the rotation shaft than a meshing portion of the first tooth and the second tooth in a rotation transmission path, the speed increasing mechanism being configured to transmit the rotation of the rotation shaft to one of the first tooth and the second tooth and configured to speed up the transmitted rotation of the rotation shaft, the one of the first tooth and the second tooth being located closer to the rotation shaft than the meshing portion in the rotation transmission path.

In the first aspect, the rotation drive mechanism may employ a configuration in which gravity of the seat is used to rotate the rotation shaft in the lowering direction, or a configuration in which the rotation is performed by an operation force of the operation handle. Moreover, in the first aspect, the rotation transmission path refers to a path through which a rotational force is transmitted between the rotation shaft, the first tooth, and the second tooth.

When a lifting or lowering operation of the seat is finished, and the first tooth and the second tooth of the lock mechanism are meshed with each other, the tooth located closer to the rotation shaft among the first tooth and the second tooth of the lock mechanism is rotated by gravity of the seat to approach complete meshing between the first tooth and the second tooth. According to the first aspect, since rotation of the tooth closer to the rotation shaft among the first tooth and the second tooth is speeded up with respect to the rotation shaft, rotation of the rotation shaft is reduced with respect to the rotation of the tooth closer the rotation shaft among the first tooth and the second tooth. Therefore, a change in a height of the seat at the end of the lifting or lowering operation can be reduced. Moreover, since a load applied between tooth surfaces when the first tooth and the second tooth mesh with each other is reduced, shock or meshing noise can be reduced.

According to a second aspect of the present disclosure, in the first aspect, the rotation drive mechanism and the speed increasing mechanism are coupled to the rotation shaft such that rotation transmission paths of the rotation drive mechanism and the speed increasing mechanism are parallel to each other According to the second aspect, rotation driving of the rotation shaft performed by the rotation drive mechanism is performed independently of the speed increasing mechanism. Therefore, an operation of the operation handle for operating the rotation drive mechanism is not changed as compared with a case where the speed increasing mechanism is not provided. Even though the speed increasing mechanism is provided, the operation of the operation handle does not become heavy and an operation amount thereof does not increase.

According to a third aspect of the present disclosure, in the second aspect, the speed increasing mechanism is a planetary gear mechanism including: an internal gear provided on the support member; a planetary gear revolving while rotating in the internal gear; a carrier rotated by the rotation shaft, the carrier revolving the planetary gear; and a sun gear rotated by rotation of the planetary gear, the sun gear being coupled to the first tooth, and the sun gear has a through hole penetrated in an axial direction of the rotation shaft at a rotation center, the rotation drive mechanism being coupled to the rotation shaft through the through hole.

According to the third aspect, a rotation transmission mechanism can be coupled to the rotation shaft through the through hole of the sun gear. As a result, load transmission paths of the rotation drive mechanism and the speed increasing mechanism can be in a parallel relationship with each other.

According to a fourth aspect of the present disclosure, in any one of the first to third aspects, the lifter device includes a friction generating portion is provided on the one of the first tooth and the second tooth and configured to apply a frictional force to rotation from the rotation shaft, the one of the first tooth and the second tooth being located closer to the rotation shaft than the meshing portion in the rotation transmission path and speeded up by the speed increasing mechanism.

According to the fourth aspect, since the rotation of the rotation shaft is speeded up by the speed increasing mechanism, the frictional force of the friction generating portion for restraining the rotation of the rotation shaft can be reduced. Therefore, space efficiency is improved, and a configuration of the friction generating portion can be simplified.

According to a fifth aspect of the present disclosure, in the fourth aspect, the friction generating portion includes a clutch portion, and the clutch portion applies the frictional force when the rotation drive mechanism rotates the rotation shaft in the lowering direction of the seat, and does not apply the frictional force when the rotation drive mechanism rotates the rotation shaft in the lifting direction of the seat.

According to the fifth aspect, a lowering speed can be restrained when the seat is lowered, and an increase in the operation force can be avoided when the seat is lifted.

According to a sixth aspect of the present disclosure, in any one of the first to fifth aspects, the first tooth is an internal tooth of a ring-shaped lock plate rotated by the rotation shaft, and the second tooth is an external tooth of a tip end portion of a pole, the pole being swingable on the support member, the external tooth being provided to face the internal tooth of the lock plate, the external tooth being selectively meshable with the internal tooth of the lock plate which is the first tooth According to the sixth aspect, the first tooth speeded up by the speed increasing mechanism is the internal tooth of the lock plate having a simple shape, and the second tooth of the swinging pole serves as a fixed side. Therefore, a centrifugal force accompanying the speed increase can be prevented from acting as an excessive external force on the pole.

According to a seventh aspect of the present disclosure, in the sixth aspect, the lifter device includes: the friction generating portion provided on the first tooth speeded up by the speed increasing mechanism, the friction generating portion being configured to apply a frictional force to rotation from the rotation shaft; and a pole holder is provided for supporting the pole with respect to the support member, and the friction generating portion includes: the lock plate; a friction spring including a ring-shaped plate spring having a wave shape in a plate surface direction, the ring-shaped plate spring having a first protruding portion of a wave-shaped surface, the first protruding portion being in contact with the lock plate; and a pressing plate pressed against the lock plate with the friction spring when the operation handle is operated, the friction spring being interposed between the pressing plate and the lock plate, and the pressing plate abuts against a second protruding portion of the wave-shaped surface of the friction spring, the second protruding portion being spaced apart from the lock plate, and the pole holder includes a leg portion extending to the support member, the leg portion being disposed in a gap between the lock plate and the friction spring or a gap between the pressing plate and the friction spring, the gap being associated with the wave-shaped surface of the friction spring.

According to the seventh aspect, the leg portion of the pole holder is disposed by using a space formed by the wave-shaped surface of the friction spring. Therefore, the space efficiency is improved, and the rotation control device can be downsized.

According to an eighth aspect of the present disclosure, in the seventh aspect, the lifter device includes an input member configured to transmit an operation force of the operation handle to the rotation drive mechanism, the input member including: a pair of feed claws configured to transmit an operation force generated by a pumping operation of the operation handle to the rotation drive mechanism in each operation direction; a first operation portion configured to press the pressing plate toward the lock plate; a second operation portion configured to mesh the second tooth with the first tooth; a first input portion configured to transmit the operation force of the operation handle to the first operation portion and the second operation portion without delay; and a second input portion configured to transmit the operation force of the operation handle to the feed claws with a delay of a first operation angle as compared with transmission performed by the first input portion, and the second operation portion is configured to function, by rotation driving of the first input portion, with a delay of a second operation angle as compared with the first operation portion, the second operation angle being smaller than the first operation angle, and the rotation drive mechanism includes a feed gear having an internal tooth configured to engage with an engagement claw of the feed claws, the feed gear being rotationally driven when the internal tooth of the feed gear is engaged with the engagement claw, the feed gear being configured to transmit rotation of the feed gear to the rotation shaft According to the eighth aspect, the first operation portion is operated by the first input portion, and the friction generating portion is in a functioning state when the operation handle is operated. Thereafter, the second operation portion is operated, and a lock state of the lock mechanism is unlocked. Finally, the feed gear is operated by the second input portion, and the rotation shaft is rotationally driven. Therefore, by operating the operation handle, a series of operations of unlocking the lock mechanism and rotationally driving the rotation shaft to lift or lower the seat can be performed in a state where the friction generating portion functions.

According to a ninth aspect of the present disclosure, in any one of the sixth to eighth aspects, the pole is individually provided corresponding to a rotation direction of the rotation shaft, the pole configuring a ratchet mechanism with the internal tooth of the lock plate such that the external tooth of the pole meshes with the internal tooth of the lock plate in a direction in which the rotation of the rotation shaft is locked while the external tooth of the pole slides on a tooth surface of the internal tooth of the lock plate in a direction in which the rotation of the rotation shaft is not locked, and an elastic body is provided to the pole such that the elastic body comes into contact with the internal tooth of the lock plate earlier than a tooth of the pole first coming into contact with the internal tooth of the lock plate when the external tooth the pole slides on the tooth surface of the internal tooth of the lock plate.

According to the ninth aspect, the abutting between the teeth when the external tooth of the pole slides on the tooth surface of the internal tooth of the lock plate can be buffered by the elastic body.

According to a tenth aspect of the present disclosure, in the eighth or ninth aspect, each feed claw configures a ratchet mechanism with the internal tooth of the feed gear such that an engagement end portion of a tip end of each feed claw engages with the internal tooth of the feed gear in one operation direction of the operation handle to rotationally drive the feed gear while the engagement end portion of the tip end slides on a tooth surface of the internal tooth of the feed gear in the other operation direction of the operation handle, and an elastic body is provided to each feed claw such that the elastic body comes into contact with the internal tooth of the feed gear earlier than a claw of each feed claw first coming into contact with the internal tooth of the feed gear when the engagement end portion slides on the tooth surface of the internal tooth of the feed gear.

According to the tenth aspect, the abutting between the teeth when the engagement end portion of the feed claw slides on the tooth surface of the internal tooth of the feed gear can be buffered by the elastic body.

Other Embodiments

Although specific embodiments have been described above, the present disclosure is not limited to those appearances and configurations, and modifications, additions and deletions can be made thereto. For example, although in the above embodiments the present disclosure is applied to the seat of an automobile, the present disclosure may also be applied to a seat mounted on an airplane, a ship, a train or the like, or a seat provided in a cinema or the like.

Although an example in which the friction generating portion 57 is provided to apply the frictional force to the rotation in the direction in which the seat is lowered is described in the above embodiments, the friction generating portion 57 may be configured to apply the frictional force not only to the direction in which the seat is lowered but also to the rotation in the direction in which the seat is lifted. The present disclosure can also be applied to a device which does not include any friction generating portion.

Although the feed claws 52 are engaged with the internal teeth 36b of the feed gear 36 to serve as a feed mechanism configured to rotate the rotation shaft 22 rotating the pinion gear 18 on the lifting side or the lowering side in the above embodiments, a stepless feeding mechanism using a friction clutch structure may also be used.

Although the rotation transmission paths of the rotation drive mechanism A and the speed increasing mechanism 25 are in the parallel relationship through using the through hole 29c of the sun gear 29 of the speed increasing mechanism 25 to transmit the rotation of the feed gear 36 of the rotation drive mechanism A to the rotation shaft 22 in the above embodiments, a through hole may be provided in the feed gear 36, and the rotation of the rotation shaft may be transmitted to the speed increasing mechanism 25 through using this through hole.

Although the leg portion 31a of the pole holder 31 is fixed to the support member 23 through the gap formed between the friction spring 58 and the pressing plate 59 in the above embodiments, the leg portion 31a may also be fixed to the support member 23 through a gap formed between the friction spring 58 and the lock plate 30.

What is claimed is:
1. A lifter device comprising:
   a pinion gear configured to mesh with an input gear of a link mechanism for lifting and lowering a seat;
   a rotation control device configured to control rotation of the pinion gear, the rotation control device including:
      a rotation shaft configured to rotate in synchronization with the pinion gear;
      a support member supporting the rotation shaft such that the rotation shaft is rotatable;
      a rotation drive mechanism configured to rotate the rotation shaft in a lifting direction or a lowering direction of the seat in accordance with an operation direction of an operation handle when the operation handle is operated to lift or lower the seat, the operation handle being configured to lift and lower the seat; and
a lock mechanism configured to allow rotation of the rotation shaft when the operation handle is operated to lift or lower the seat, and configured to lock the rotation of the rotation shaft when the operation handle is in an operation-released state, the lock mechanism including:
a first tooth provided on one of the rotation shaft and the support member; and
a second tooth provided on the other one of the rotation shaft and the support member, the second tooth being configured to selectively mesh with the first tooth to lock relative rotation of the rotation shaft and the support member; and
a speed increasing mechanism provided closer to the rotation shaft than a meshing portion of the first tooth and the second tooth in a rotation transmission path, the speed increasing mechanism being configured to transmit the rotation of the rotation shaft to one of the first tooth and the second tooth and configured to speed up the transmitted rotation of the rotation shaft, the one of the first tooth and the second tooth being located closer to the rotation shaft than the other one of the first tooth and the second tooth in the rotation transmission path.

2. The lifter device according to claim 1,
wherein the rotation drive mechanism and the speed increasing mechanism are coupled to the rotation shaft such that rotation transmission paths of the rotation drive mechanism and the speed increasing mechanism are parallel to each other.

3. The lifter device according to claim 2,
wherein the speed increasing mechanism is a planetary gear mechanism including:
an internal gear provided on the support member;
a planetary gear revolving while rotating in the internal gear;
a carrier rotated by the rotation shaft, the carrier revolving the planetary gear; and
a sun gear rotated by rotation of the planetary gear, the sun gear being coupled to the first tooth via a sun gear plate of the sun gear, and
wherein the sun gear has a through hole penetrated in an axial direction of the rotation shaft at a rotation center, the rotation drive mechanism being coupled to the rotation shaft through the through hole.

4. The lifter device according to claim 1, further comprising:
a friction generating portion provided on the one of the first tooth and the second tooth and configured to apply a frictional force to rotation from the rotation shaft,
wherein the rotation from the rotation shaft that is transmitted to the one of the first tooth and the second tooth is speeded up by the speed increasing mechanism.

5. The lifter device according to claim 4,
wherein the friction generating portion includes a clutch portion, and
wherein the clutch portion applies the frictional force when the rotation drive mechanism rotates the rotation shaft in the lowering direction of the seat, and does not apply the frictional force when the rotation drive mechanism rotates the rotation shaft in the lifting direction of the seat.

6. The lifter device according to claim 1,
wherein the first tooth is an internal tooth of a ring-shaped lock plate rotated by the rotation shaft, and wherein the second tooth is an external tooth of a tip end portion of a pole, the pole being swingable on the support member, the external tooth being provided to face the internal tooth of the lock plate, the external tooth being selectively meshable with the internal tooth of the lock plate which is the first tooth.

7. The lifter device according to claim 6, further comprising:
a friction generating portion provided on the first tooth speeded up by the speed increasing mechanism, the friction generating portion being configured to apply a frictional force to rotation from the rotation shaft; and
a pole holder supporting the pole with respect to the support member,
wherein the friction generating portion includes:
the lock plate;
a friction spring including a ring-shaped plate spring having a wave shape in a plate surface direction, the ring-shaped plate spring having a first protruding portion of a wave-shaped surface, the first protruding portion being in contact with the lock plate; and
a pressing plate pressed against the lock plate with the friction spring when the operation handle is operated, the friction spring being interposed between the pressing plate and the lock plate,
wherein the pressing plate abuts against a second protruding portion of the wave-shaped surface of the friction spring, the second protruding portion being spaced apart from the lock plate,
wherein the pole holder includes a leg portion extending to the support member, the leg portion being disposed in a gap between the lock plate and the friction spring or a gap between the pressing plate and the friction spring, the gap being associated with the wave-shaped surface of the friction spring.

8. The lifter device according to claim 7, further comprising:
an input member configured to transmit an operation force of the operation handle to the rotation drive mechanism, the input member including:
a pair of feed claws configured to transmit an operation force generated by a pumping operation of the operation handle to the rotation drive mechanism in each operation direction;
a first operation portion configured to press the pressing plate toward the lock plate;
a second operation portion configured to mesh the second tooth with the first tooth;
a first input portion configured to transmit the operation force of the operation handle to the first operation portion and the second operation portion; and
a second input portion configured to transmit the operation force of the operation handle to the feed claws with a delay of a first operation angle as compared with transmission performed by the first input portion,
wherein the second operation portion is configured to function, by rotation driving of the first input portion, with a delay of a second operation angle as compared with the first operation portion, the second operation angle being smaller than the first operation angle, and
wherein the rotation drive mechanism includes a feed gear having an internal tooth configured to engage with an engagement claw of the feed claws, the feed gear being rotationally driven when the internal tooth of the feed gear is engaged with the engagement claw, the feed gear being configured to transmit rotation of the feed gear to the rotation shaft.

9. The lifter device according to claim 6, wherein the pole is individually provided corresponding to a rotation direction of the rotation shaft, the pole configuring a ratchet mechanism with the internal tooth of the lock plate such that the external tooth of the pole meshes with the internal tooth of the lock plate in a direction in which the rotation of the rotation shaft is locked while the external tooth of the pole slides on a tooth surface of the internal tooth of the lock plate in a direction in which the rotation of the rotation shaft is not locked, and wherein an elastic body is provided to the pole such that the elastic body comes into contact with the internal tooth of the lock plate earlier than a tooth of the pole first coming into contact with the internal tooth of the lock plate when the external tooth of the pole slides on the tooth surface of the internal tooth of the lock plate.

10. The lifter device according to claim 8, wherein each feed claw configures a ratchet mechanism with the internal tooth of the feed gear such that an engagement end portion of a tip end of each feed claw engages with the internal tooth of the feed gear in one operation direction of the operation handle to rotationally drive the feed gear while the engagement end portion of the tip end slides on a tooth surface of the internal tooth of the feed gear in the other operation direction of the operation handle, and wherein an elastic body is provided to each feed claw such that the elastic body comes into contact with the internal tooth of the feed gear earlier than a claw of each feed claw first coming into contact with the internal tooth of the feed gear when the engagement end portion slides on the tooth surface of the internal tooth of the feed gear.

* * * * *